US012436194B2

(12) United States Patent
Ehya et al.

(10) Patent No.: US 12,436,194 B2
(45) Date of Patent: Oct. 7, 2025

(54) FAULT DETECTION IN SYNCHRONOUS MACHINES

(71) Applicant: NORWEGIAN UNIVERSITY OF SCIENCE AND TECHNOLOGY (NTNU), Trondheim (NO)

(72) Inventors: Hossein Ehya, Trondheim (NO); Arne Nysveen, Trondheim (NO)

(73) Assignee: NORWEGIAN UNIVERSITY OF SCIENCE AND TECHNOLOGY (NTNU), Trondheim (NO)

( * ) Notice: Subject to any disclaimer, the term of this patent is extended or adjusted under 35 U.S.C. 154(b) by 41 days.

(21) Appl. No.: 17/754,840

(22) PCT Filed: Oct. 4, 2020

(86) PCT No.: PCT/EP2020/078951
§ 371 (c)(1),
(2) Date: Apr. 13, 2022

(87) PCT Pub. No.: WO2021/074248
PCT Pub. Date: Apr. 22, 2021

(65) Prior Publication Data
US 2024/0369634 A1 Nov. 7, 2024

(30) Foreign Application Priority Data
Oct. 14, 2019 (GB) ...................... 1914844

(51) Int. Cl.
*G01R 31/34* (2020.01)
(52) U.S. Cl.
CPC .................... *G01R 31/34* (2013.01)
(58) Field of Classification Search
CPC ................ G01R 31/34; G01R 31/2841; G01R 31/31715; G01R 31/31725; G01R 31/3177

(Continued)

(56) References Cited

U.S. PATENT DOCUMENTS 10,075,016 B2 * 9/2018 Wilkins ............... H02J 3/01
10,411,480 B2 * 9/2019 Garcia ................. F03D 7/0284
(Continued)

FOREIGN PATENT DOCUMENTS

CN 102135600 A 7/2011
CN 104 535 267 4/2015
(Continued)

OTHER PUBLICATIONS

International Search Report and Written Opinion of the International Application No. PCT/EP2020/078951 mailed Feb. 12, 2021.
(Continued)

*Primary Examiner* — Raul J Rios Russo
*Assistant Examiner* — Trung Q Nguyen
(74) *Attorney, Agent, or Firm* — HESLIN, ROTHENBERG, FARLEY & MESITI, P.C.; George S. Blasiak, Esq.

(57) ABSTRACT

A method of fault detection in synchronous machines includes using at least one sensor to determine parameters linked to the magnetic field generated within the synchronous machine including parameters based on one or more of magnetic field strength, rotor current or voltage, stator current or voltage, and vibration. The sensor measurements are processed to identify data artefacts linked to the magnetic field, wherein the processing includes one or more signal processing techniques based on time, frequency, and both time and frequency. Subsequently, the output of the signal processing is analysed in order to identify and categorise irregularities in the magnetic field that are indicative of a fault in the synchronous machine. The analysing step includes recognising patterns in the processed sensor measurements, via use of computer aided pattern recognition techniques such as via machine learning algorithms.

23 Claims, 12 Drawing Sheets

Figure 1:
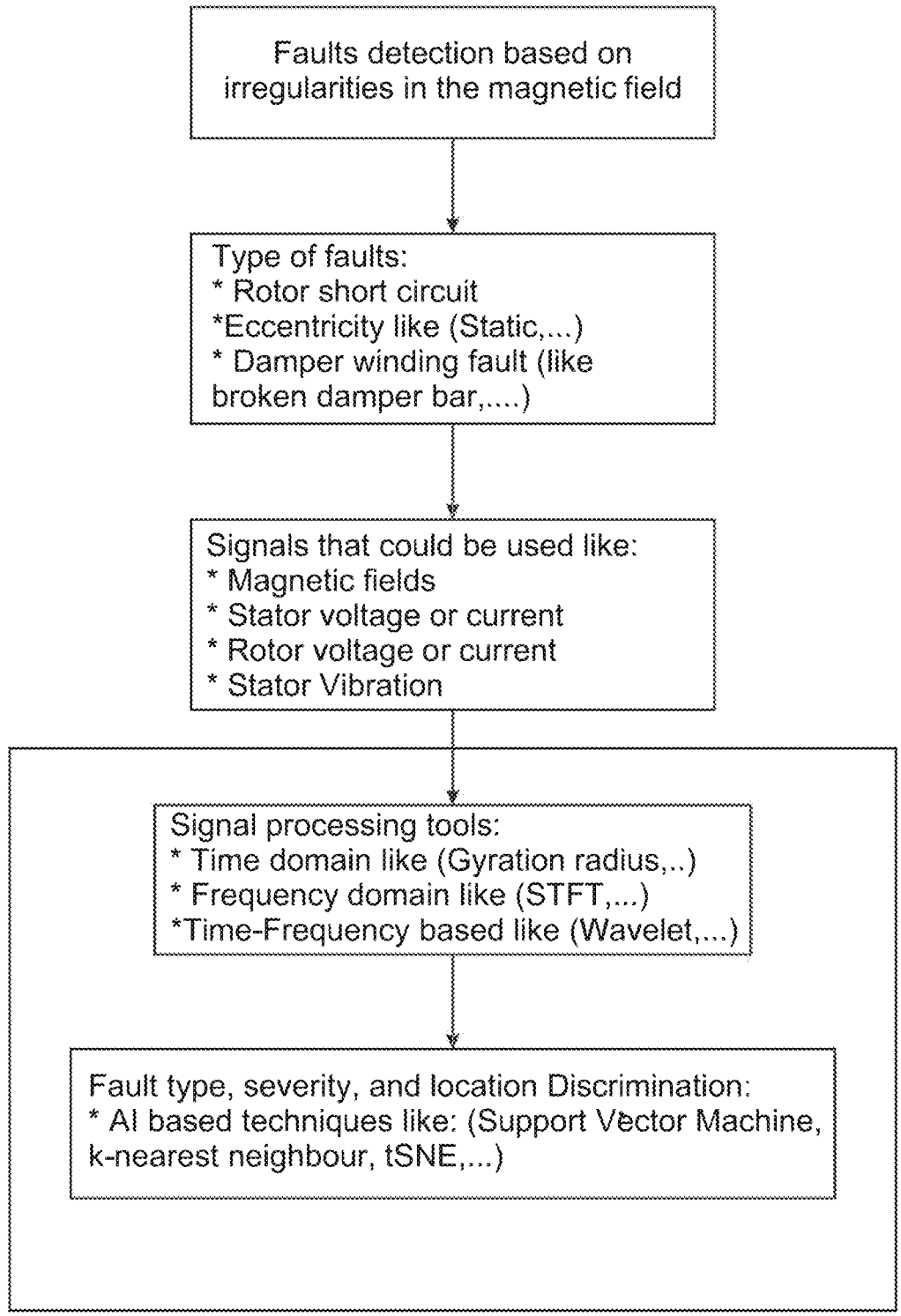

(58) Field of Classification Search
USPC ............... 324/600, 500, 520, 522, 765.01, 324/762.03–762.6, 763.01, 750.22, 324/757.05, 207.13

See application file for complete search history.

(56) References Cited

U.S. PATENT DOCUMENTS

| | | | |
|---|---|---|---|
| 2009/0091289 | A1 | 4/2009 | Nandi et al. |
| 2012/0001580 | A1 | 1/2012 | Zhang et al. |
| 2012/0259563 | A1* | 10/2012 | Beatty ............... G01R 31/346 702/59 |
| 2013/0257049 | A1 | 10/2013 | Taylor et al. |
| 2014/0117912 | A1* | 5/2014 | Gajic ................. H02H 7/06 318/490 |
| 2017/0016960 | A1 | 1/2017 | Rodriguez et al. |
| 2020/0182684 | A1* | 6/2020 | Yoskovitz ........... G01R 33/02 |
| 2022/0393625 | A1* | 12/2022 | He ..................... H02P 29/64 |

FOREIGN PATENT DOCUMENTS

| | | |
|---|---|---|
| CN | 106 597 276 | 4/2017 |
| JP | S61112976 A | 5/1986 |
| JP | 2005251185 A | 9/2005 |
| JP | 2010256348 A | 11/2010 |
| JP | 2014512799 A | 5/2014 |
| WO | WO2012146613 A1 | 11/2012 |
| WO | WO 2014/117279 | 8/2014 |
| WO | WO 2015/173662 | 11/2015 |
| WO | WO2017195681 A1 | 2/2017 |
| WO | WO 2018/198111 | 11/2018 |
| WO | WO 2021/074248 | 4/2021 |

OTHER PUBLICATIONS

Lu Dingguo et al., "Adaptive Feature Extraction and SVM Classification for Real-Time Fault Diagnosis of Drivetrain Gearboxes", 2013 IEEE Energy Conversion Congress and Exposition, Sep. 15, 2013, pp. 3934-3940.

Tun Pyae Phyo et al., "Brushless Synchronous Generator Turn-to-Turn Short Circuit Fault Detection Using Multilayer Neural Network", 2018 Asian Conference on Energy, Power and Transportation Electrification, Oct. 30, 2018, pp. 1-8.

Kerboua A et al., "Fault Diagnosis in Induction Motor Using Pattern Recognition and Neural Networks", 2018 International Conference on Signal, Image, Vision and Their Applications, IEEE, Nov. 26, 2018, pp. 1-7.

Pecina-Sanchez J. A. et al., "Multiple Fault Diagnosis in Variable Speed Drives Through Current Measurements", Electrical Engineering Computing Science and Automatic Control, 2011 8th Int'l Conf. on IEEE, Oct. 26, 2011, pp. 1-6.

Alvarez-Gonzalez Fernando et al., "Permanent Magnet Synchronous Machine Stator Windings Fault Detection by Hilbert-Huang Transform", The Journal of Engineering, The Institution of Engineering and Technology, UK, vol. 2019, No. 17, pp. 3505-3509.

Ehya H et al.; Time Domain Signature Analysis of Synchronous Generator under Broken Damper Bar Fault; 45th Annual Conference of the IEEE Industrial Electronics Society; Oct. 1, 2019; pp. 1423-1428.

Bashir Mahdi Ebrahimi et al., "Dynamic Eccentricity Fault Diagnosis in Round Rotor Synchronous Motors", Energy Conversion dn Management, Elsevier Science Publishers, Oxford GB, vol. 52, No. 5, Dec. 13, 2020, pp. 2092-2097, XP028169633.

Bin Li et al., "Model-Free Information Extraction in Enriched Nonlinear Phase-Space", Arxiv. Org. Cornell University Library, (Apr. 14, 2018), XP081236868.

Ferreira Jose Gregorio et al., "An Application of Machine Learning Approach to Fault Detection of a Synchronous Machine", 2017 International Symposium on Electrical Machines, IEEE, (Jun. 18, 2017), pp. 1-6, XP033131265.

Rastko Fiser et al., "Computations of Magnetic Field Anomalies in Synchronous Generator Due to Rotor Excitation Coil Faults", IEEE Transactions on Magnetics, IEEE Service Center, New York, vol. 49, No. 5, (May 1, 2013), pp. 2303-2306, XP011508345.

Athira et al.; "Fault Detection and Visualization Technique for Hybrid Electric Vehicle Components"; International Conference on Power, Energy, Control and Transmissions System; Feb. 2018; pp. 159-169.

Patents Act 1977: Search Report under Section 17(5); Intellectual Property Office; Application No. GB1914844.4; Mailing Date Mar. 31, 2020; 3 pages.

Office Action; Japan Patent Office; Application No. 2022-522662; Aug. 27, 2024; 6 pages. (submitted with copy of original document and full text English translation).

China National Intellectual Property Administration, First Office Action in related CN Application 202080073898.9 mailed May 1, 2025. 14 pages (w/translation).

List of Foreign References and Their Translations, dated Jun. 9, 2025. 2 pages.

Korean Intellectual Property Office, Written Opinion, mailed Mar. 21, 2025. 49 pages (w/translation).

Ehya, H. et al.; "Pattern Recognition of Inter-Turn Short Circuit Fault in Wound Field Synchronous Generator via Stray Flux Monitoring", 2020 International Conference on Electrical Machines (ICEM), IEEE, vol. 1, Aug. 23, 2020, pp. 2631-2636. DOI: 10.1109/ICEM49940.2020.9270986.

Valavi, Mostafa et al.; "Electromagnetic Analysis and electrical Signature-Based Detection of Roto Inter-Turn Faults in Salient-Pole Synchronous Machine", IEEE Transactions on Magnetics, IEEE, vol. 54, No. 9, Sep. 1, 2018, pp. 1-9, DOI: 10.1109/TMAG.2018.2854670.

Da, Yao et al.; "Health Monitoring, Fault Diagnosis and Failure Prognosis Techniques for Brushless Permanent Magnet Machines", 2011 IEEE Vehicle Power and Propulsion Conference (VPPC 2011): Chicago, Illinois, USA, Sep. 6-9, 2011, IEEE, Sep. 6, 2011, pp. 1-7, DOI 10.1109/VPPC.2011.6043248.

Ehya, Hossein et al.; "An Expeditious Algorithm for Identification and Classification of Rotor Faults in Salient Pole Synchronous Generators", IEEE Transactions on Industrial Electronics, IEEE, vol. 71, No. 2, Mar. 12, 2023. pp. 2008-2017, DOI: 10.1109/TIE.2023.3253954.

Lipo, T.A.; "Analysis of Synchronous Machines", 2nd Edition, CRC Press, 2012/2017. DOI: 10.1201/b12211.

Ehya, Hossein et al.; "Static and Dynamic Eccentricity Fault Diagnosis of Large Salient Pole Synchronous Generators by Means of External Magnetic Field", IET Electric Power Applications, vol. 15, No. 7, pp. 890-902, 2021. DOI: 10.1049/elp2.12068.

Toliyat, H.A. et al.; "Simulation and Detection of Dynamic Air-Gap Eccentricity in Salient Pole Synchronous Machines", IEEE Transactions On Industry Applications, vol. 35, No. 1, Jan./Feb. 1999, pp. 86-93, 1999. DOI: doi.org/10.1109/28.740849.

Tabatabaei, Iman et al.; "Modeling and Simulation of a Salient-Pole Synchronous Generator with Dynamic Eccentricity Using Modified Winding Function Theory", IEEE Transactions on Magnetics, vol. 40, No. 3, May 2004, pp. 1550-1555. DOI: 10.1109/TMAG.2004.826611.

Babaei, Mojtaba et al.; "A Detailed Analytical Model of a Salient-Pole Synchronous Generator Under Dynamic Eccentricity Fault", IEEE Transactions On Magnetics, vol. 47, No. 4, Apr. 2011, pp. 764-771. DOI: 10.1109/TMAG.2011.2105498.

Bruzzese, Claudio; "Diagnosis of Eccentric Rotor in Synchronous Machines by Analysis of Split-Phase Currents-Part I: Theoretical Analysis", IEEE Transactions On Industrial Electronics, vol. 61, No. 8, Aug. 2014, pp. 4193-4205. DOI: 10.1109/TIE.2013.2284141.

Gyftakis, K.N. et al.; "Off-Line Detection of Static Eccentricity in Salient-Pole Synchronous Machines", 2018 XIII International Conference on Electrical Machines (ICEM), pp. 1919-1924, 2018. DOI: 10.1109/ICELMACH.2018.8507042.

Ehya, Hossein et al.; "Advanced Fault Detection of Synchronous Generators Using Stray Magnetic Field", IEEE Transactions On Industrial Electronics, vol. 69, No. 11, Nov. 2022, pp. 11675-11685. DOI: 10.1109/TIE.2021.3118363.

(56) References Cited

OTHER PUBLICATIONS

Bruzzese, Claudio et al.; "Harmonic Signatures of Static Eccentricities in the Stator Voltages and in the Rotor Current of No-Load Salient-Pole Synchronous Generators", IEEE Transactions On Industrial Electronics, vol. 58, No. 5, May 2011, pp. 1606-1624. DOI: 10.1109/TIE.2010.2087296.

Sadeghi, Iman et al.; "Analytic method for Eccentricity Fault Diagnosis in Salient-pole Synchronous Generators", 2017 International Conference on Optimization of Electrical and electronic Equipment (OPTIM) & 2017 Intl' Aegean Conference on Electrical Machines and Power Electronics (ACEMP), pp. 261-267, IEEE, 2017. DOI: 10.1109/OPTIM.2017.7974981.

Kedjar, Bachir et al.; "Large Synchronous Machines Diagnosis Based on Air-Gap and Stray Fluxes—An Overview", 2020 International Conference on Electrical Machines (ICEM), vol. 1, pp. 1384-1389. IEEE. DOI: 10.1109/ICEM49940.2020.9270868.

Lee, Sang Bin et al.; "Condition Monitoring of Industrial Electric Machines: State of the Art and Future Challenges", IEEE Industrial Electronics Magazine, vol. 14, Iss. 4, Dec. 2020, pp. 158-167. IEEE. DOI: 10.1109/MIE.2020.3016138.

Jiang, Chen et al.; "A Review of Condition Monitoring of Induction Motors Based on Stray Flux", 2017 IEEE Energy Conversion Congress and Exposition (ECCE), IEEE, pp. 5424-5430, 2017. DOI: 10.1109/ECCE.2017.8096907.

Capolino, Gérard-André et al.; "State of the Art on Stray Flux Analysis in Faulted Electrical Machines", 2019 IEEE Workshop on Electrical Machines Design Control and Diagnosis (WEMDCD), vol. 1, pp. 181-187, IEEE, 2019. DOI: 10.1109/WEMDCD.2019.8887805.

Zamudio-Ramirez, Israel et al.; "Magnetic Flux Analysis for the Condition Monitoring of Electric Machines: A Review", IEEE Transactions On Industrial Informatics, vol. 18, No. 5, May 2022, Apr. 2, 2021, pp. 2895-2908. DOI: 10.1109/TII.2021.3070581.

He, Yu-Ling et al.; "A New External Search Coil Based Method to Detect Detailed Static Air-Gap Eccentricity Position in Nonsalient Pole Synchronous Generators", IEEE Transactions On Industrial Electronics, vol. 68, No. 8, Aug. 2021, pp. 7535-7544, 2020. DOI: 10.1109/TIE.2020.3003635.

Cuevas, Mauricio et al.; "Noninvasive Detection of Winding Short-Circuit Faults in Salient Pole Synchronous Machine With Squirrel-Cage Damper", IEEE Transactions On Industry Applications, vol. 54, No. 6, Nov./Dec. 2018, pp. 5988-5997, 2018. DOI: 10.1109/TIA.2018.2861860.

Cuevas, Mauricio et al.; "Non-Invasive Detection of Rotor Short-Circuit Fault in Synchronous Machines by Analysis of Stray Magnetic Field and Frame Vibrations", IEEE Transactions On Magnetics, vol. 52, No. 7, Jul. 2016, pp. 1-4, 2016. DOI: 10.1109/TMAG.2016.2514406.

Yun, Jangho et al.; "Reliable Flux-Based Detection of Field Winding Failures for Salient Pole Synchronous Generators", IEEE Transactions On Energy Conversion, vol. 34, No. 3, Sep. 2019, pp. 1715-1718, 2019. DOI: 10.1109/TEC.2019.2917622.

Ehya, Hossein et al.; "Pattern Recognition of Interturn Short Circuit Fault in a Synchronous Generator Using Magnetic Flux", IEEE Transactions on Industry Applications, vol. 57, No. 4, Jul./Aug. 2021, pp. 3573-3581, 2021. DOI: 10.1109/TIA.2021.3072881.

Irhoumah, Miftah et al.; "Information Fusion With Belief Functions for Detection of Interturn Short-Circuit Faults in Electrical Machines Using External Flux Sensors", IEEE Transactions On Industrial Electronics, vol. 65, No. 3, Mar. 2018, pp. 2642-2652, 2017. DOI: 10.1109/TIE.2017.2745408.

Gyftakis, Konstantinos N. et al.; "Critical Aspects of Demagnetization Faults in Multi-Stage Direct Drive Permanent Magnet Generators for Renewables", IEEE Transactions On Industry Applications, vol. 59, No. 6, Nov./Dec. 2023, pp. 6655-6663, 2023. DOI: 10.1109/TIA.2023.3299905.

Goktas, Taner et al.; "A Comparative Study of Current, Vibration and Stray Magnetic Flux Based Detection for Parallel Misalignment Fault in Induction Motors", 2021 IEEE 13th International Symposium on Diagnostics for Electrical Machines, Power Electronics and Drives (SDEMPED), vol. 1, 2021, pp. 11-16. DOI: 10.1109/SDEMPED51010.2021.9605507.

* cited by examiner

FAULT DETECTION IN SYNCHRONOUS MACHINES

CROSS REFERENCE TO RELATED APPLICATIONS

This application is a national stage filing under section 371 of International Application No. PCT/EP2020/078951 filed on Oct. 14, 2020, and published on Apr. 22, 2021 as WO2021/074248 A1, which claims priority to Great Britain Application No. 1914844.4 filed on Oct. 14, 2019. The entire contents of WO2021/074248 A1 are hereby incorporated herein by reference.

The present invention relates to a method of fault detection in synchronous machines, as well as to a related fault detection system, which may be combined with a synchronous machine, and corresponding computer programme products.

Synchronous machines, and in particular large synchronous machines such as hydropower generators, play a pivotal role in the production of electric power. High reliability of power supply depends on these synchronous generators. An unplanned outage of energy production centres (power plants) and production lines are one of the most critical concerns in the electric power industries. Energy production systems in large scale entirely depend on large electrical machines, especially synchronous machines. Large synchronous machines are one of the most expensive pieces of equipment in the power plant. In addition, their maintenance and repair are costly, and any termination of the synchronous machine from the network due to fault leads to economic loss. Today, periodic maintenance systems are used in most industries related to electrical machines.

Different types of electrical and mechanical faults can occur in a synchronous machine. Mechanical faults could induce vibration, unbalanced magnetic pull into the specific part or the whole part of the generator. Mechanical faults may be caused by the unsuited operating condition, mechanical degradation, or defects during assembly of the machine. If the minimum air gap between rotor and stator core varies, then the synchronous generator has a condition which is called eccentricity fault. There are two types of eccentricity: static and dynamic. Static eccentricity is the condition where the shortest length in a non-uniform distribution of air-gap has a constant length and is fixed in space. Static eccentricity is one of prevalent fault in the synchronous generators. A lower level of eccentricity does not cause any damage to the machines; however, it should be detected at its early stage before the rotor core rub the stator core and windings.

In general, faults can occur due to external factors such as severe short circuits in the power grid or internally due to gradual defects. Rapid response to the fault is the responsibility of the protection system of the synchronous machine. A typical protection system uses voltage, current profile, or extracted data associated with them at the terminal of the stator. In the case of hydropower generators, hydropower plants often have a sophisticated protection system that consists of over-voltage, over-current, differential relays in addition to several subsystems and equipment that trip automatically as a quick response to abnormal operating conditions. The purpose of the protection system is to ensure immediate and correct disconnection of the production unit in the event of a severe fault in the machine or power network that is connected to it. It can disconnect the electrical machine from the power system based on measured data in order to protect it against fast and destructive faults.

However, existing protection systems may not detect a gradual defect inside the machine that may lead to future serious faults. It is, therefore, beneficial to have a condition monitoring system to perform further fault detection task. The present invention relates to methods and systems used in this context.

Viewed from a first aspect, the invention provides a method of fault detection in synchronous machines; the method comprising:
using at least one sensor to determine parameters linked to the magnetic field generated within the synchronous machine including parameters based on one or more of magnetic field strength, rotor current or voltage, stator current or voltage, and vibration;
processing the sensor measurements to identify data artefacts linked to the magnetic field, wherein the processing includes one or more signal processing techniques based on time, frequency, and both time and frequency; and
analysing the output of the signal processing in order to identify and categorise irregularities in the magnetic field that are indicative of a fault in the synchronous machine, wherein the analysing includes recognising patterns in the processed sensor measurements, via use of computer aided pattern recognition techniques such as via machine learning algorithms.

Using this method it becomes possible to more effectively determine faults with synchronous machines. The method of the first aspect relates to the detection of faults within the synchronous machine itself, for example in relation to mechanical and or electrical components of the synchronous machine, typically those found internal to the machine. Faults within the machine are to be differentiated from faults external to the machine, e.g. in relation to the excitation system for magnetization of the machine or an external electrical network. Faults with such components are typically hard to identify and diagnose without invasive measurements and/or modifications to the machine. It would be an advantage to provide effective non-invasive techniques. The method gives particular advantages in the case of large synchronous machines such as synchronous electrical machines used as hydropower generators. Whilst other fault finding methods exist they are not focused on the realisation that the magnetic field can be used to diagnose numerous problems with the synchronous machine through the identification and categorisation of irregularities in the magnetic field. The method may be for detecting faults linked with one or more of eccentricity, damper winding faults, and short circuit.

A synchronous machine is an AC electrical machine in which, at steady state the rotation of the shaft is synchronized with the frequency of the generated voltage, or if the machine acts as a motor, the supply voltage. The rotation period for a synchronous machine is hence equal to an integral number of AC cycles or a fractional number of AC cycles given by the number of pole-pairs. The synchronous machines described herein may contain multiphase AC electromagnets on the stator of the machine that create a magnetic field which rotates in time with the oscillations of the line current.

It is important in the present context to appreciate the difference between a synchronous machine and an induction machine. The synchronous machine rotates at a rate locked to the line frequency since it does not rely on current induction to produce the rotor's magnetic field. By contrast, an induction machine requires slip: the rotor must rotate slightly slower than the AC alternations in order to induce current in the rotor winding. The presently described method does not relate to induction machines.

The method may comprise using signal processing techniques in relation to frequencies that are higher than the line frequency. That is to say, the method does not work only with signals in the power frequency range (typically 50 Hz or 60 Hz) and in fact may specifically not relate to signal processing techniques using patterns identifiable in that frequency range. Thus, the method may comprise working with frequencies that are higher than (and optionally do not include) the power frequency range, i.e. higher than 60 Hz. The method advantageously involves signal processing techniques based on frequencies that are super-harmonics of the line frequency, typically frequencies well above the line frequency, which may be frequencies above 75 Hz, e.g. between 75 Hz to 400 Hz, and/or may include frequencies in the kHz range and above. Thus, the frequency(ies) used in the method of the first aspect may be frequencies above 1 kHz, and in particular may be super-harmonics of the line frequency of the synchronous machine. The step of analysing the output may hence comprise recognising patterns in processed sensor measurements including such frequencies, with the patterns being identifiable in these larger frequency ranges. The signal processing technique may comprise using sampling frequencies in the kHz range, such as a sampling frequency of 5 kHz or 10 kHz, or higher.

As noted above, the method may be used for fault detection in large synchronous machines such as hydropower generators. In this context a large synchronous machine is one which, when acting as a generator, can produce electricity from 100 KW up to 500 MW, or more. A hydropower generator is an electrical machine used for generating electricity from water flow, and may typically be a salient pole synchronous generator. The method of fault detection may be particularly beneficial for salient pole synchronous generators.

The method of fault detection makes use of irregularities in the magnetic field of the synchronous machine. This may be a transient magnetic field that arises, for example, during start-up or shut-down of the machine. Such a transient magnetic field can be differentiated from a steady state magnetic field or fluctuating magnetic field that arises during on-going use of the synchronous machine, such as when a hydropower generator is running at a steady speed or otherwise is in continuous use to generate electricity. It has been found that fault detection can be enhanced by identifying and categorising irregularities in such a transient magnetic field. Thus, the method may be used during the period when there is a transient magnetic field in order to find irregularities that are indicative of faults, and may hence involve fault detection during start-up of the synchronous machine. The inventors have realised that some fault types may be best detected whilst there is a transient magnetic field, or can only be detected when the machine is in a transient state.

The method may involve using at least one existing sensor or at least one non-invasive sensor. This allows the fault detection to obtain the various advantages discussed above without the need for additional invasive sensors and without the need for modifications to the synchronous machine. This is beneficial for fault detection in pre-existing machines. Alternatively, where convenient, including when designing new machines with integrated fault finding capabilities, additional sensors may be provided compared to conventional large synchronous machines. In particular, it may be beneficial to more directly measure magnetic field signals via sensors with elements installed invasively, such as within the air gap between rotor and stator. In some examples the method makes use of hall effect sensor or search coils that are installed in the air gap.

Where an existing sensor is used, the existing sensor may be a sensor already provided with the synchronous machine, such as one or more sensors used during operation of the synchronous machine for control of the machine. For example, this may be a voltage or current sensor used to monitor performance of the machine. The existing sensor may be a non-invasive sensor, i.e. a sensor mounted external to the machine and/or taking measurements in a contactless fashion, or it may be a sensor that is integrated within the synchronous machine.

Alternatively or additionally at least one non-invasive sensor may be used with the machine specifically for the fault detection, such as a sensor provided as a part of a fault detection system, where this sensor is temporarily placed with the machine for performing the fault detection method. None-invasive sensors that may be used include sensors taking measurements of electrical properties such as voltage, current, resistance or related parameters. This may be done via added sensors or via existing sensors such as a voltage sense provided with a potential transformer of the synchronous machine. A further possibility is the use of an accelerometer for vibration signal acquisition, with this accelerometer being placed external to the machine, i.e. non-invasively.

The method may use multiple sensors, with a plurality of different measurements being taken by more than one sensor including existing and/or non-invasive sensor(s).

In some examples the method uses only existing sensors and/or non-invasive sensors. Thus, there is no use of new invasive sensors. For example, the method may not require any physical modification to the synchronous machine to place or attach a new sensor.

Advantageously, the method may not involve any data transfer from the moving parts of the rotor, thus there may not be a sensor placed on the moving parts of the rotor, and/or there may be an absence of added slip rings or other modifications for data transfer. This minimises the impact of the fault detection method on the performance of the machine, since the machine's moving parts are not encumbered by additional sensors.

The method may use sensor for voltage and/or current, such as a sensor provided for the synchronous machine at a potential transformer (PT) thereof. There is typically one or more sensor for voltage and/or current at the potential transformer. This allows an existing sensor to be used for the proposed method, with sensor measurements from the potential transformer being used to identify magnetic field irregularities, such as during a transient magnetic field whilst the machine starts up. Such measurements may, for example, be used to identify and categorise faults such as damper winding faults or eccentricity faults.

The method may include determining a radius of gyration for the rotor of the synchronous machine and using the radius of gyration to identify and categorise irregularities in the magnetic field. The radius of gyration can be assessed to determine various faults as discussed further below. In some cases, examples may use measurements from sensors at the potential transformer in order to determine the radius of gyration.

The step of processing the sensor measurements includes one or more signal processing techniques. Examples include time series data mining (TSDM), Fourier transform (FT), fast Fourier transform (FFT), Hilbert transform (HT), Hilbert-Huang transform (HHT), continuous wavelet transform (CWT) and discrete wavelet transform (DWT). These techniques may comprise using sampling frequencies in the kHz range, such as a sampling frequency of 5 kHz or 10 kHz, or higher.

In some example implementations the method may include the use of radius of gyration data, optionally obtained via time series data mining, for detecting a damper winding fault, in particular for detecting a broken damper bar. This may be done by mapping the phase space for induced voltage in the field winding of the synchronous machine. Advantageously this voltage can be determined or measured via a sensor at the potential transformer. It has been found that in the case of a broken damper bar the radius of gyration, as mapped based on a phase space for induced voltage in the field winding of the synchronous machine, differs from a machine without a broken damper bar. This difference allows for pattern recognition techniques to automatically identify magnetic field irregularities indicative of a broken damper bar, based on recognising characteristic patterns in the phase space diagram. In basic terms, the amplitude of the radius of gyration will increase when there is a broken damper bar. The method may include pattern recognition based on differentiating (or matching) between the results of measurements of synchronous machines that are known to be healthy, and the results of measurements of synchronous machines that are known to have a broken damper bar. It will be appreciated that a similar method may provide a way to detect other types of faults based on pattern recognition for measurements of synchronous machines that are known to have other faults.

Alternatively or additionally, in some example implementations the method may include the use of radius of gyration data, optionally obtained via time series data mining, for detecting an eccentricity fault, advantageously including a static eccentricity fault. This may be done by mapping the phase space for induced voltage in the field winding of the synchronous machine. As with the damper winding fault detection discussed above, this voltage may be determined or measured via a sensor at the potential transformer. In the case of detecting an eccentricity fault the step of analysing the output of the signal processing (for example, from the time series data mining) may include determining a normalised radius of gyration with reference to a radius of gyration for a machine that is known to be healthy. The normalised radius of gyration may be defined as the difference between a healthy radius of gyration and measured (i.e. suspected faulty) radius of gyration, divided by the healthy radius of gyration. This gives an index allowing for automated identification and categorisation of eccentricity faults, by assessing the value of the normalised radius of gyration (which would be zero for a healthy machine).

The step of analysing includes recognising patterns in the processed sensor measurements via use of computer aided pattern recognition techniques. Thus, the method may include a comparison of the patterns found in processed sensor measurements to patterns considered to be indicative of a fault in the synchronous machine. This may be a specific fault such that the pattern recognition may give a clear diagnosis of the fault. Alternatively this may be an indicator of a non-specific fault that needs further investigation or consideration with reference to other measurements, including other processed sensor measurements (and optionally the patterns therein), before a fault type can be diagnosed. The computer aided pattern recognition techniques may be techniques based on machine learning algorithms. For example, pattern recognition may be based on a machine learning algorithm trained with a plurality of processed sensor measurements that are known to relate to fault free machines as well as a plurality of processed sensor measurements that are known to relate to machines with a fault. The machine learning process may include training with a plurality of processed sensor measurements that are known to relate to specific categories of fault (for example eccentricity faults or damper winding faults, and short circuit) and/or to specific types of fault (for example a damper winding fault in the form of a broken damper bar).

Viewed from a second aspect, the invention provides a fault detection system for fault detection in synchronous machines, the fault detection system comprising: a data processing apparatus for connection to at least one sensor in order to receive parameters linked to the magnetic field generated within the synchronous machine including parameters based on one or more of magnetic field strength, rotor current or voltage, stator current or voltage, and vibration;

wherein the data processing apparatus is configured to:
process the sensor measurements to identify data artefacts linked to the magnetic field, wherein the processing includes one or more signal processing techniques based on time, frequency, and both time and frequency; and
analyse the output of the signal processing in order to identify and categorise irregularities in the magnetic field that are indicative of a fault in the synchronous machine, wherein the analysing includes recognising patterns in the processed sensor measurements, via use of computer aided pattern recognition techniques such as via machine learning algorithms.

The data processing apparatus may be configured to perform steps as discussed above in relation to the first aspect and optional features thereof. The invention further extends to a synchronous machine, such as a large synchronous machine acting as a hydropower generator, including the fault detection system. The fault detection system may include structural and/or functional features as discussed above in relation to the first aspect and optional features thereof. The fault detection system is configured for, and used for, detection of faults within the synchronous machine, which as explained above are to be distinguished from faults external to the machine such as issues relating to an excitation system or external electrical network. The fault detection system is advantageously concerned with frequencies that are higher than the line frequency/power frequency, as discussed above.

For example, the fault detection system may include at least one existing sensor or at least one non-invasive sensor, or other sensors as discussed above. This may be an existing and/or non-invasive sensor placed at the synchronous machine for detection of parameters based on one or more of magnetic field strength, rotor current or voltage, stator current or voltage, and vibration. The existing sensor may be a sensor already provided with the synchronous machine, such as one or more sensors provided for use during operation of the synchronous machine for control of the machine. For example, this may be a voltage or current sensor used to monitor performance of the machine. The existing sensor may be a non-invasive sensor, i.e. a sensor arranged to be mounted external to the machine and/or taking measurements in a contactless fashion, or it may be a sensor that is integrated within the synchronous machine. Alternatively or additionally at least one non-invasive sensor may be used with the machine specifically for the fault detection, such as a sensor provided as a part of the fault detection system, where this sensor is configured to be temporarily placed with the machine for performing fault detection. The fault detection system may comprise multiple sensors, with a plurality of different measurements being provided to the data processing apparatus by more than one sensor including existing and/or non-invasive sensor(s).

In some examples the fault detection system consists only of pre-existing sensors of the synchronous machine and/or non-invasive sensors. Thus, there may be no requirement for new sensors to be installed with the machine, and in particular there may be no requirement for installation of new invasive sensors such as those that require a physical modification to the synchronous machine.

The fault detection system may be arranged to use sensors without any data transfer from the moving parts of the rotor, thus there may not be a sensor placed on the moving parts of the rotor. This minimises the impact of the fault detection method on the performance of the machine, since the machine's moving parts are not encumbered by additional sensors.

The data processing apparatus may be any apparatus suitably configured to perform the required method steps. It may be a dedicated processor of the fault detection system, which may hence comprise a suitable processor such as a computer processor with appropriate data input and output connections. Alternatively the fault detection system may comprise a general purpose computer device, such as a desktop computer, a laptop computer, a tablet or a smartphone, with this computer device configured to perform the required method steps, either as its primary role or as a secondary role, such as via the use of a software application provided to be installed on a general purpose computer device.

The fault detection system may comprise a suitable interface for communication of sensor signals to the data processing apparatus, such as a wired or wireless system for transmission of output signals from the sensors to the data processing apparatus.

Viewed from a third aspect, the invention provides a computer programme product comprising instructions that, when executed within a fault detection system as in the second aspect, will configure the data processing apparatus thereof to: process the sensor measurements to identify data artefacts linked to the magnetic field, wherein the processing includes one or more signal processing techniques based on time, frequency, and both time and frequency; and analyse the output of the signal processing in order to identify and categorise irregularities in the magnetic field that are indicative of a fault in the synchronous machine, wherein the analysing includes recognising patterns in the processed sensor measurements, via use of computer aided pattern recognition techniques such as via machine learning algorithms.

The computer programme product may include instructions arranged to configure the data processing apparatus to perform other steps as described above in relation to the method of the first aspect and optional features thereof. The computer programme product may for example be firmware or software configured for the data processing apparatus, such as firmware for a dedicated processor or software for a general purpose computer device.

Figure 2:
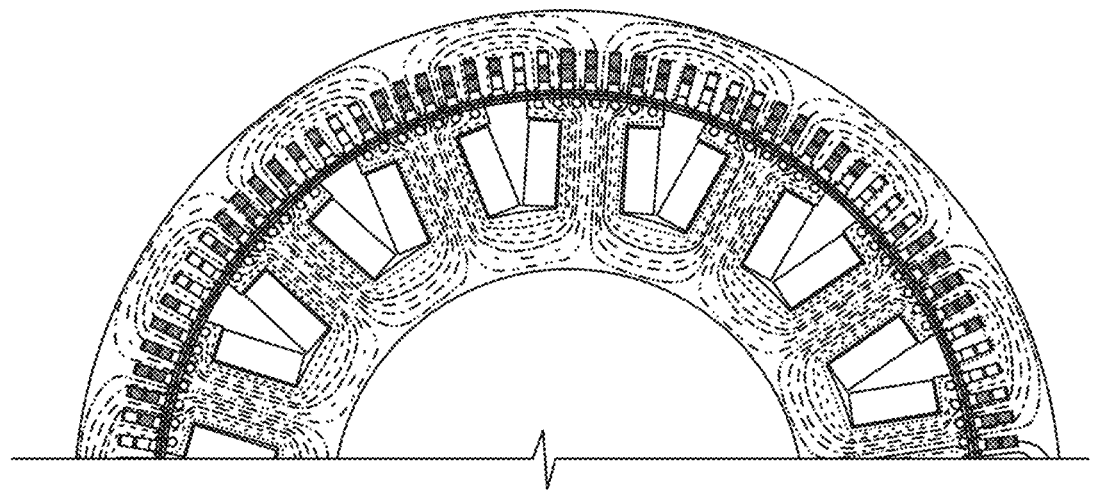
Figure 3:
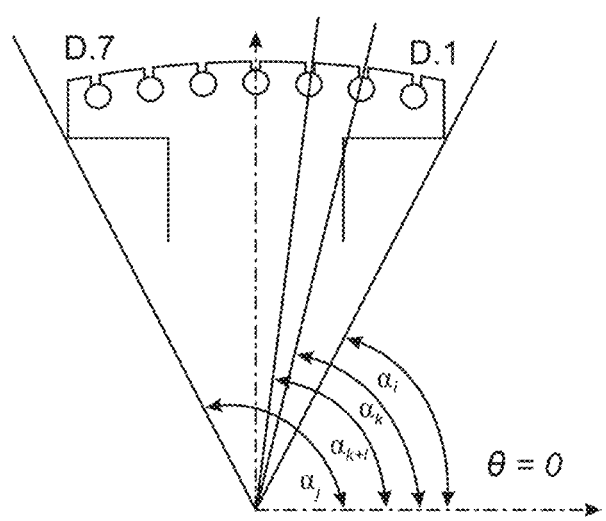
Figure 4:
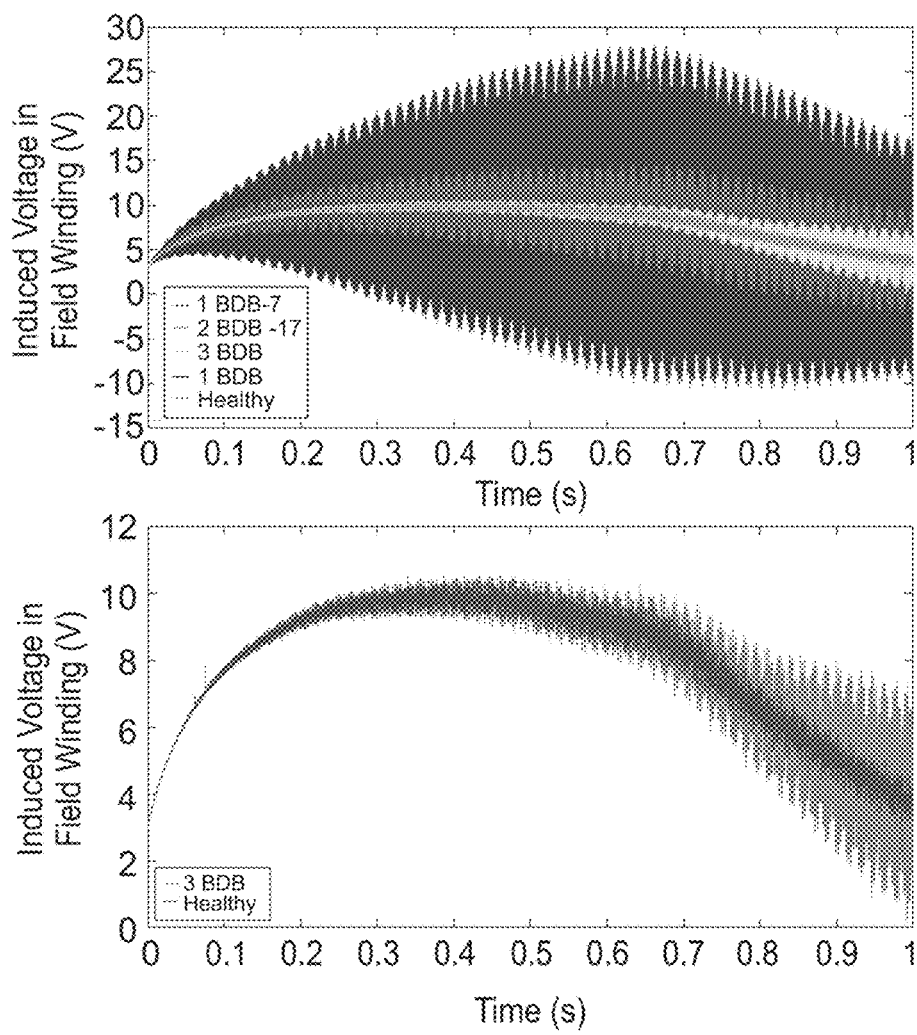
Figure 5:
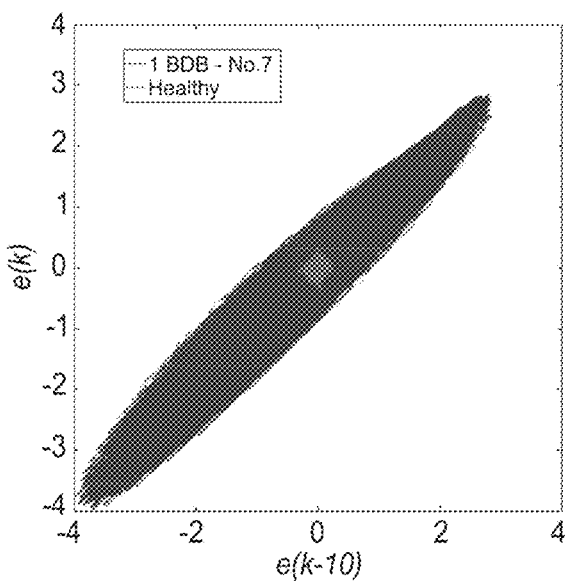
Figure 6:
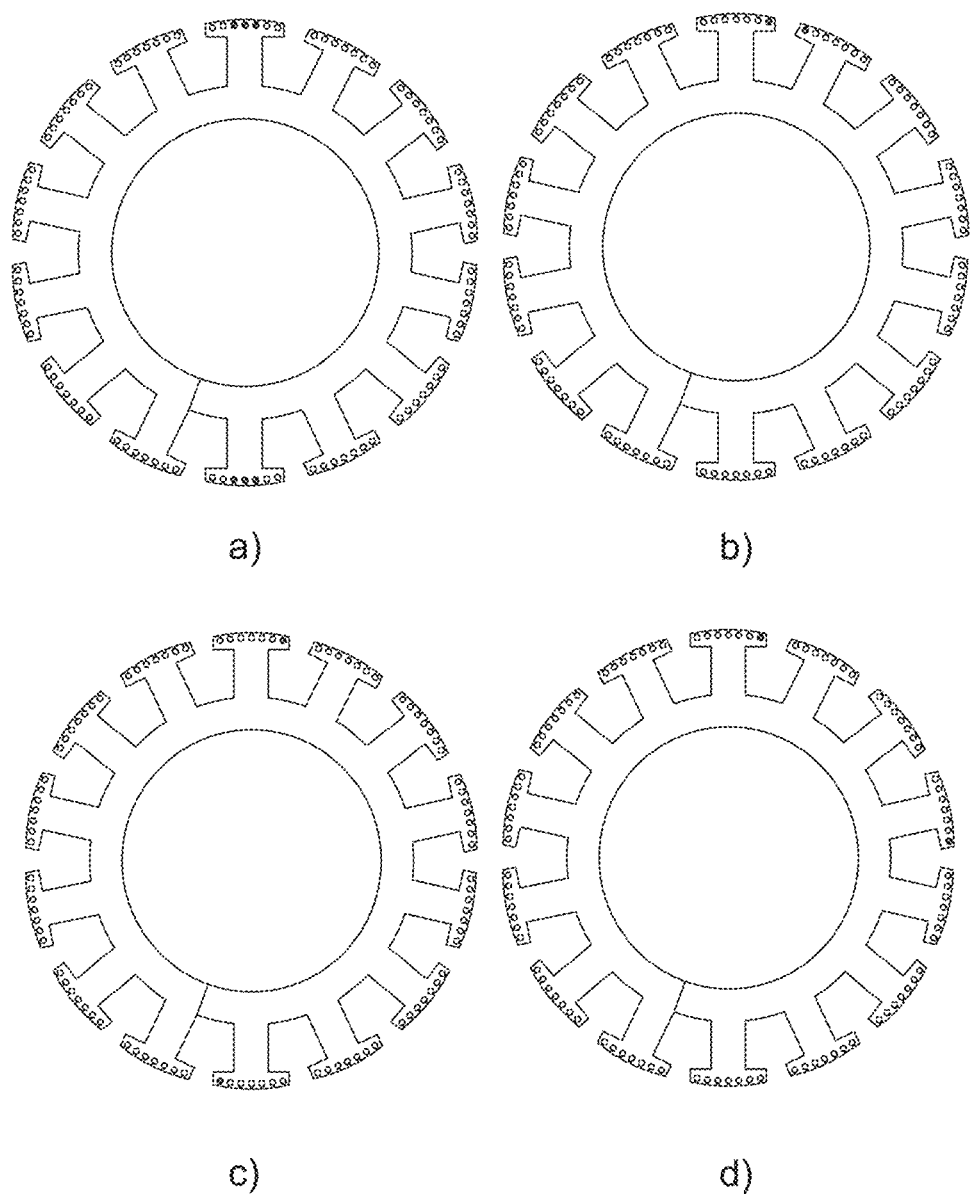
Figure 7:
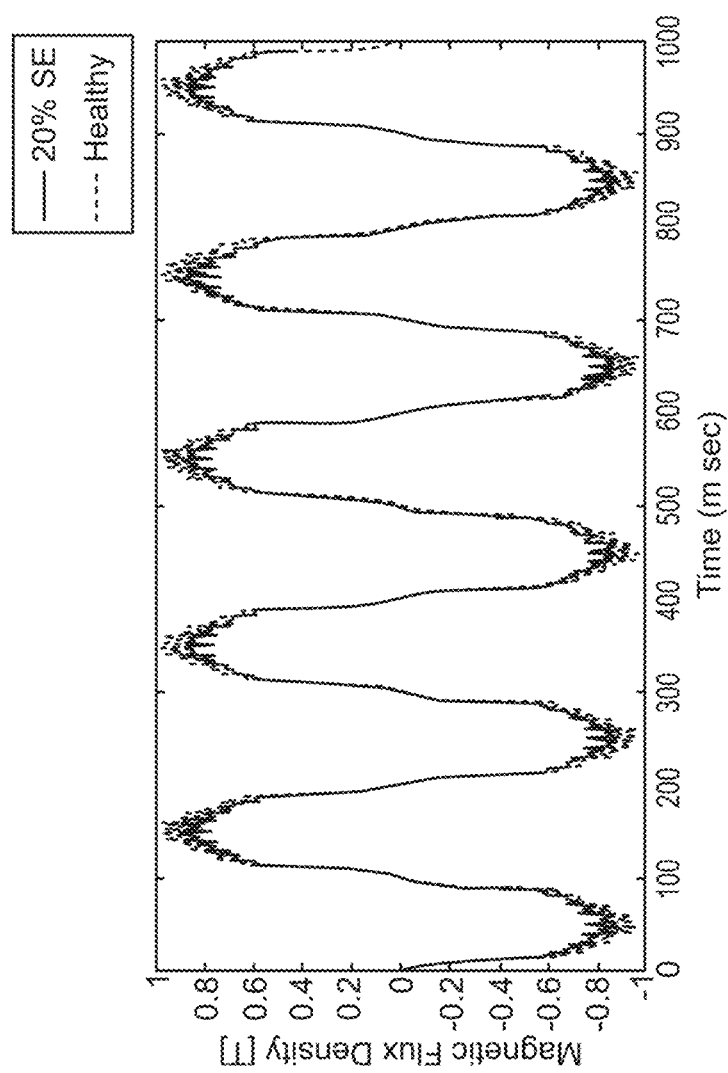
Figure 7:
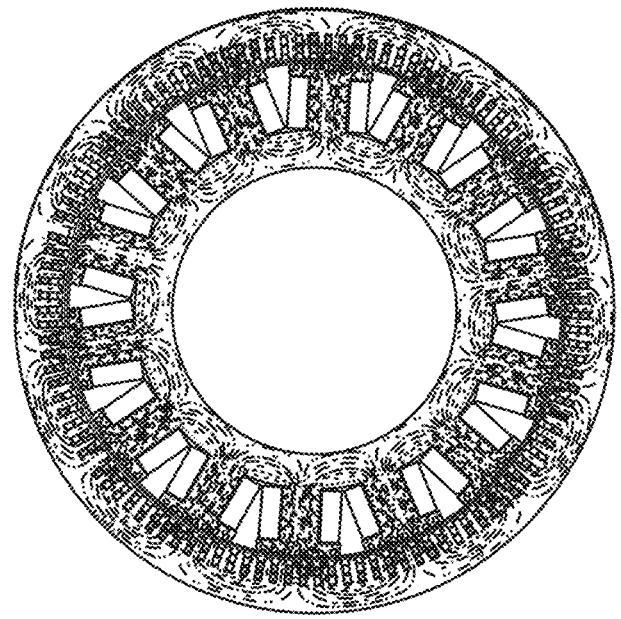
Figure 8:
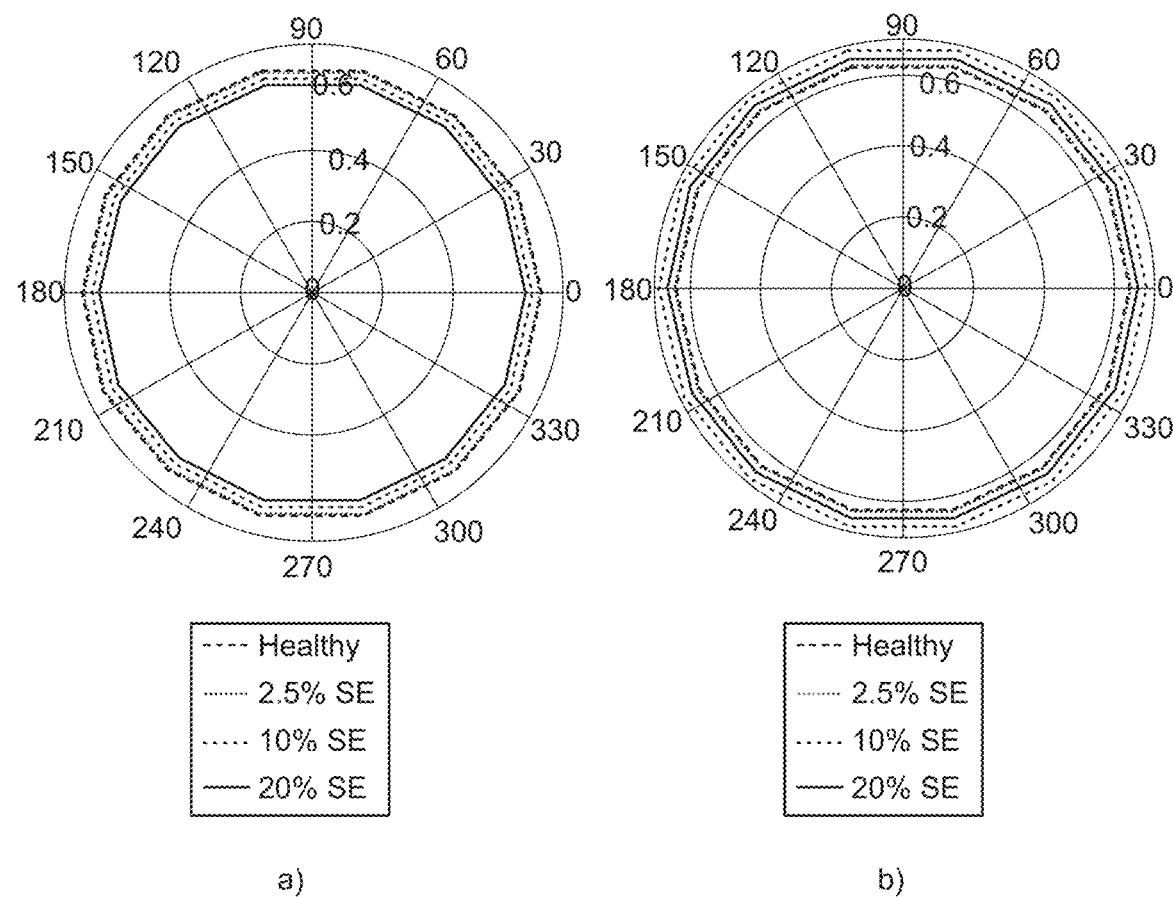
Figure 9:
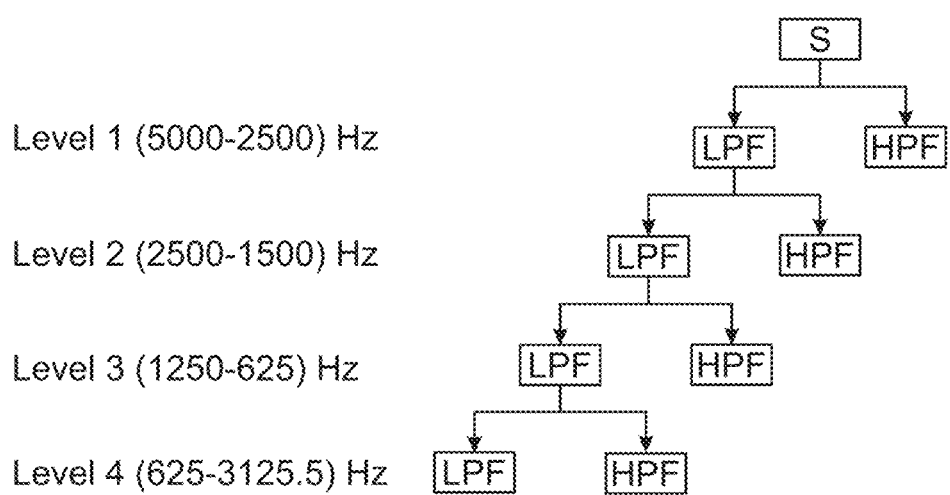
Figure 10:
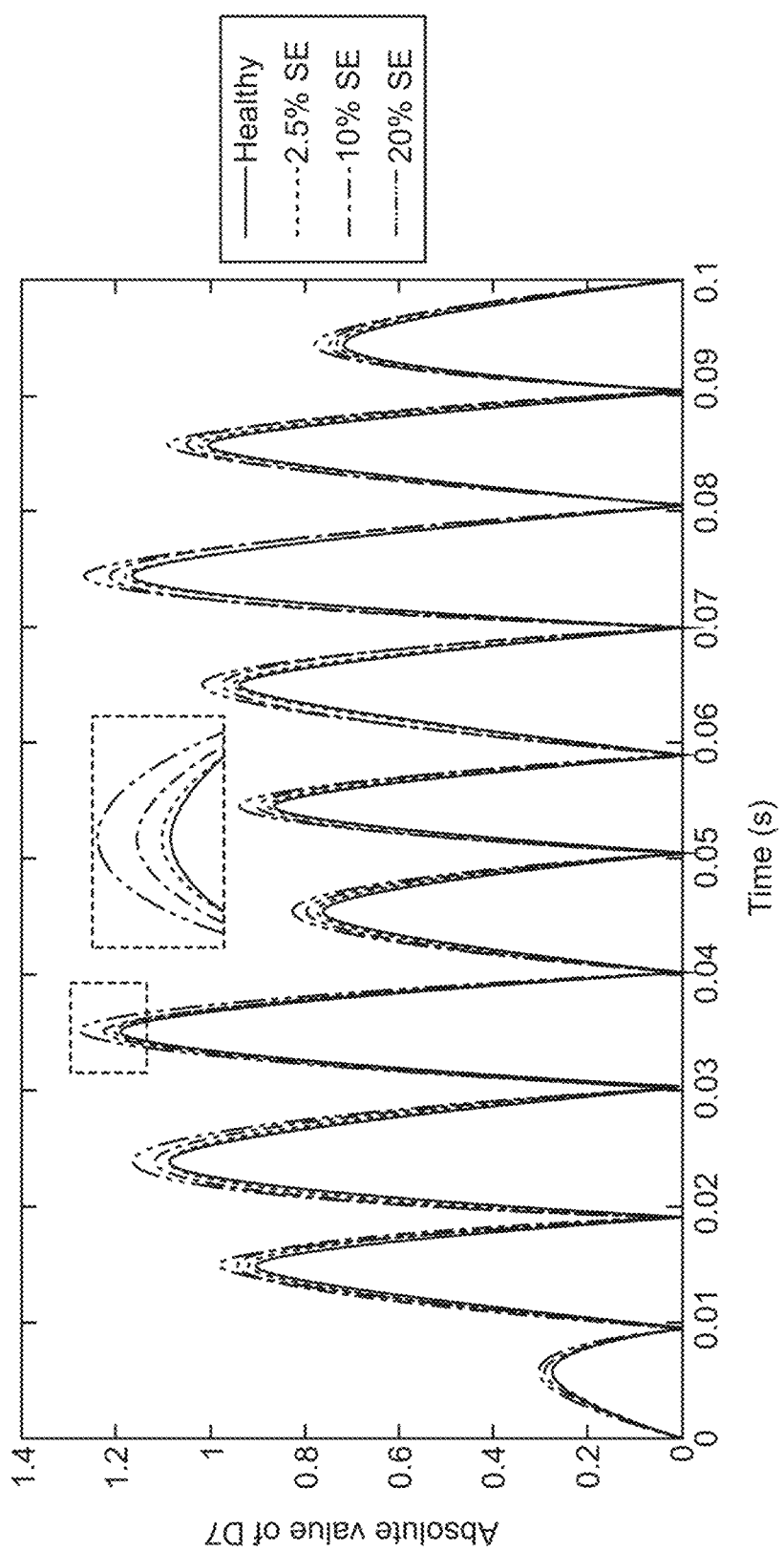
Figure 11:
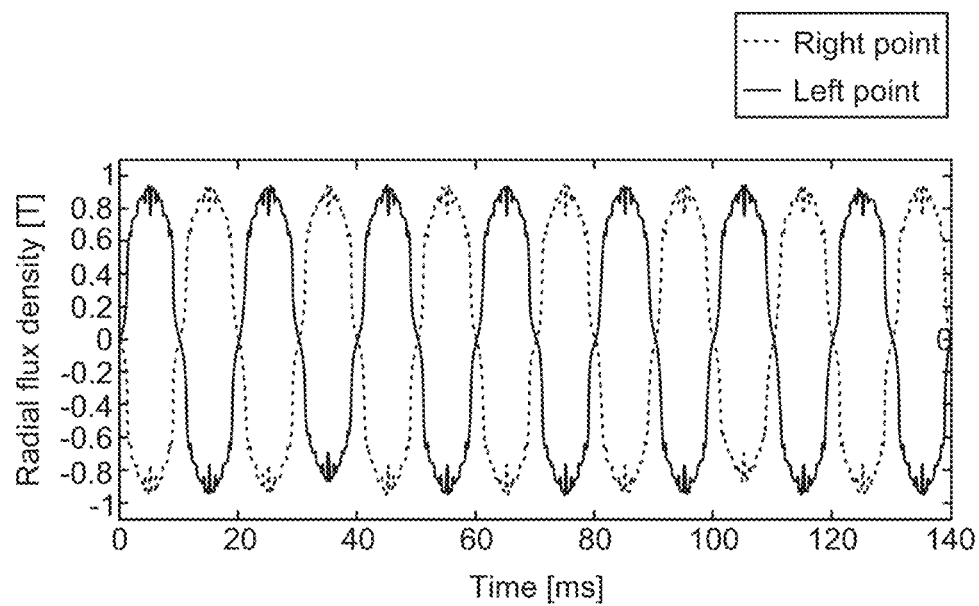
Figure 12:
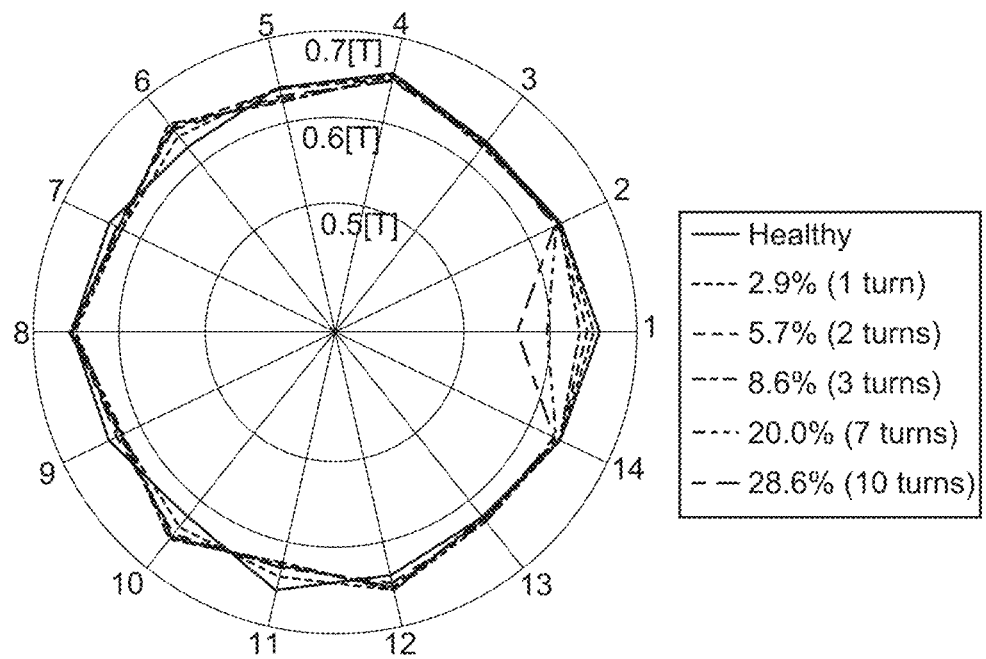
Figure 13:
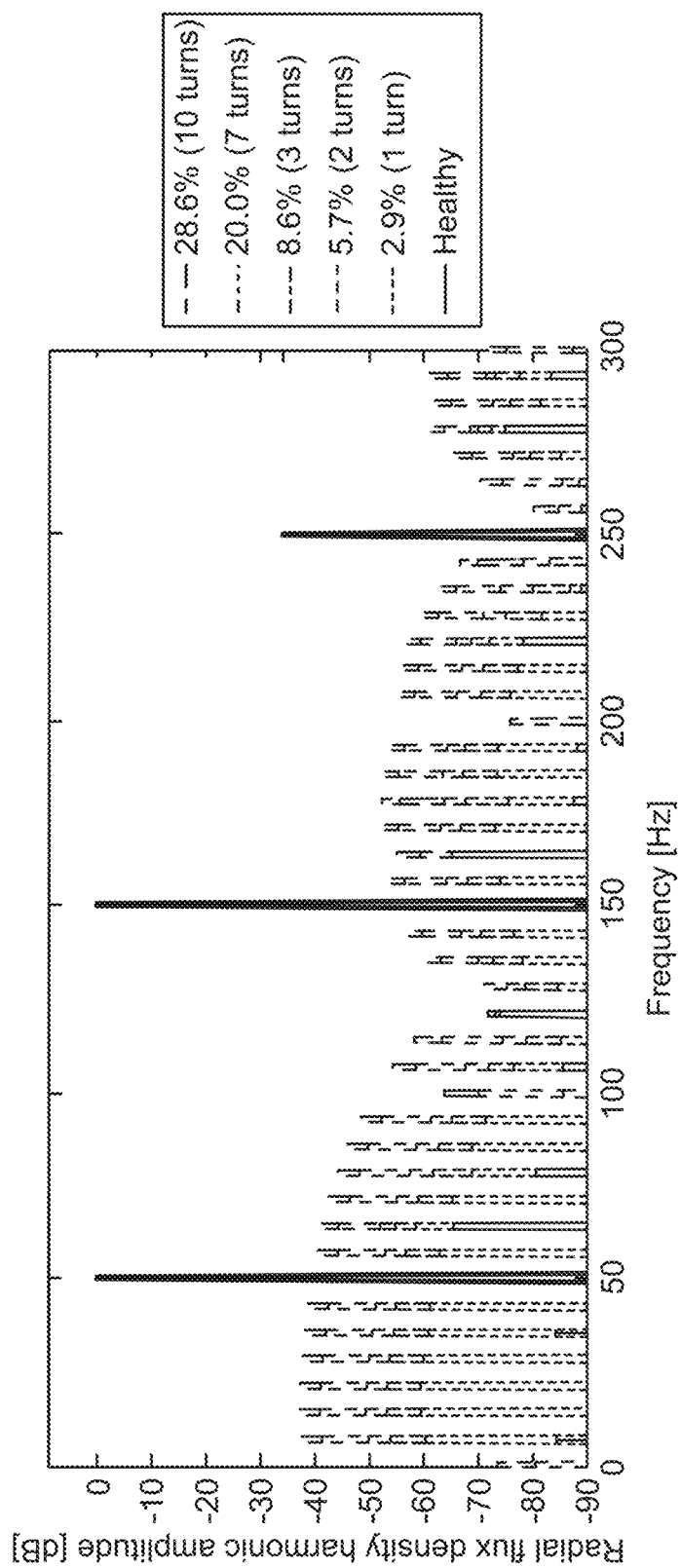
Figure 14:
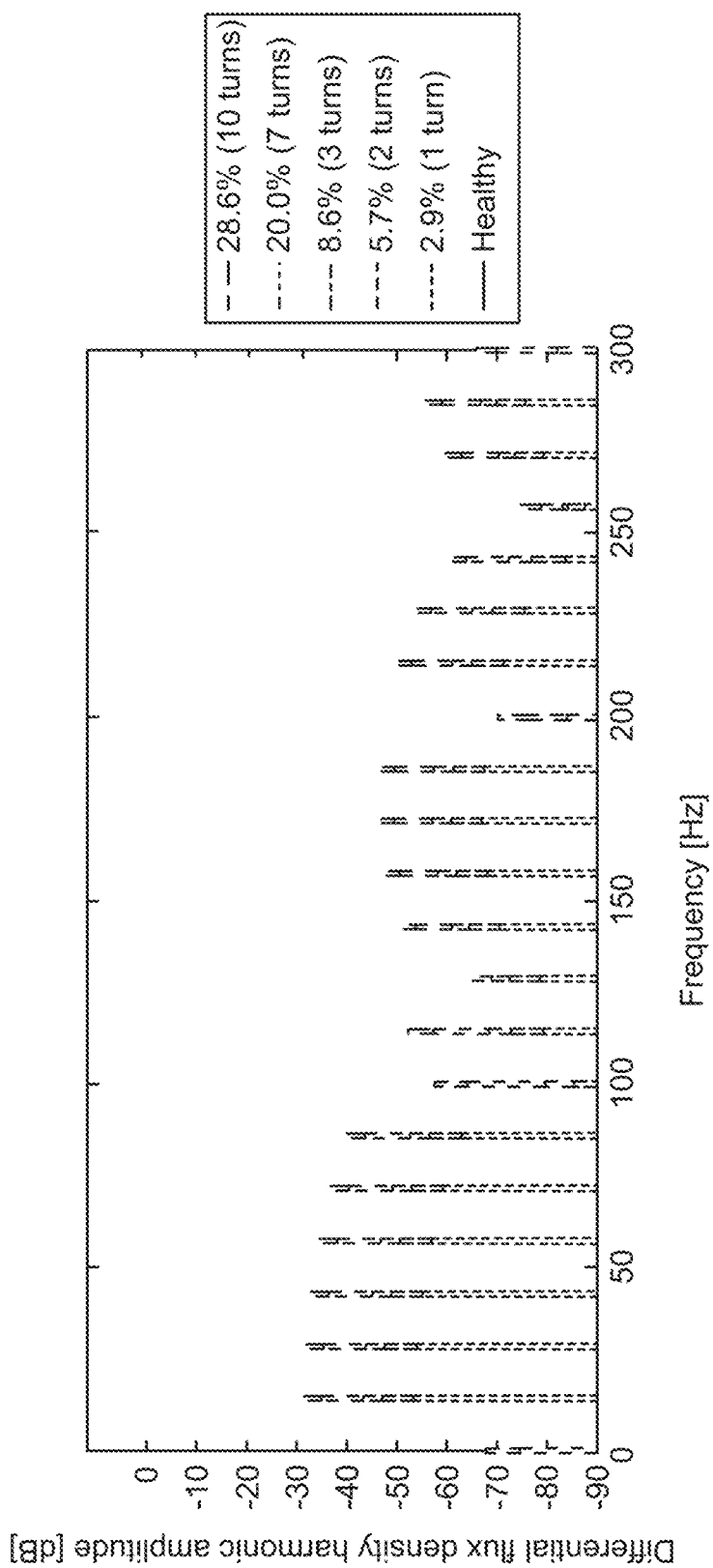
Figure 15:
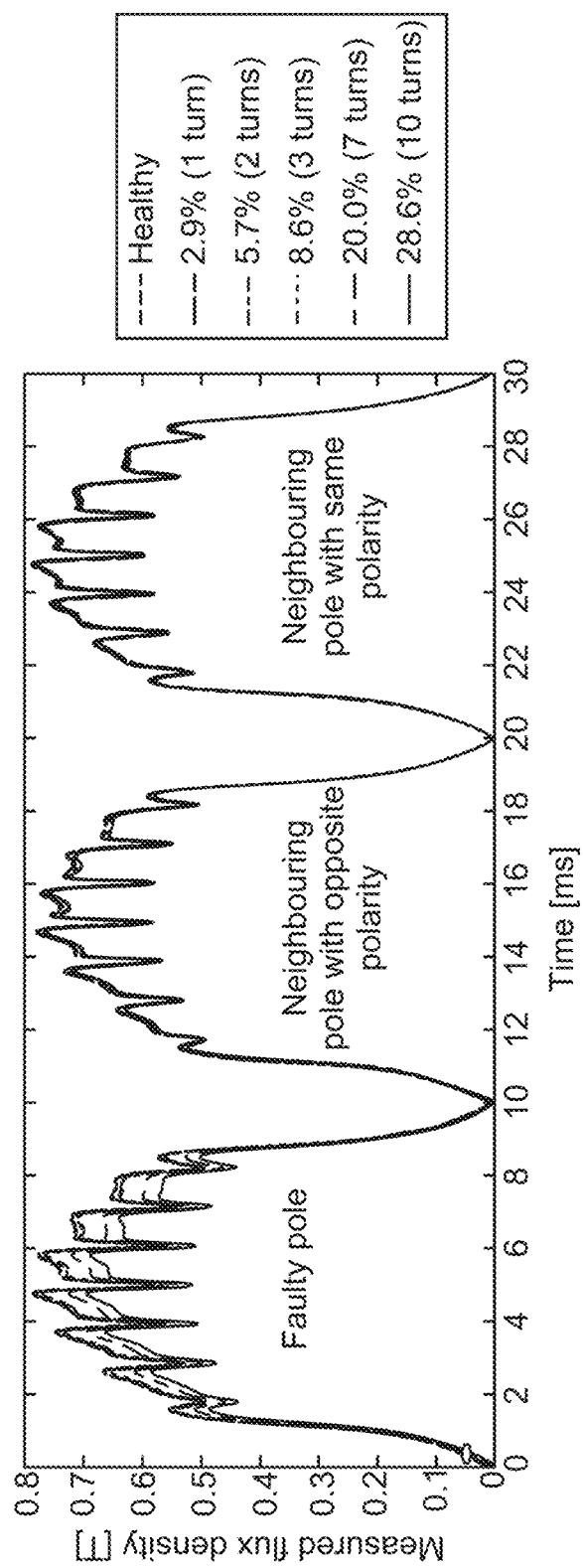

Certain example embodiments of the invention will now be described by way of example only and with reference to the accompanying drawings in which:

FIG. 1 is a flow chart of a fault detection system;
FIG. 2 shows a two dimensional scheme of a simulated salient pole synchronous generator;
FIG. 3 shows the distributed location of the damper bars in the SPSG;
FIG. 4 includes two plots comparing induced voltage in the rotor field winding of a SPSG in the healthy, and faulty cases for different number of BDBs;
FIG. 5 is a diagram showing the phase space of the healthy and one broken damper bar at the edge of an SPSG rotor pole;
FIG. 6 shows examples for the location of broken damper bars of the SPSG with reference to how this impacts asymmetry of the air gap magnetic field, (a) six BDBs in each opposite poles, (b) two BDBs in the edge of two adjacent poles, (c) two BDBs in the edge of two opposite poles, (d) two BDBs at two-pole pitch distance;
FIG. 7 shows: in the left hand drawing, a simulated salient pole synchronous generator and the location of installed hall effect sensors in the airgap; and in the right hand drawing magnetic flux density of a right sensor in healthy (and under 20%) static eccentricity fault;
FIG. 8 illustrates the simulated average flux density of each pole in a polar diagram for: a) right sensor; and b) left sensor;
FIG. 9 is a diagram showing a procedure of detailed signal extraction of the wavelet transforms;
FIG. 10 shows the wavelet coefficient of the absolute value of D7 in a healthy machine and in a machine with a static eccentricity fault;
FIG. 11 is a plot showing air gap magnetic flux density of a SPSG in no-load under 7 short circuited turns;
FIG. 12 is a polar diagram of the average flux density of the SPSG poles at no-load;
FIG. 13 shows the frequency spectrum of the radial flux density at no-load;
FIG. 14 shows the frequency spectrum of flux density for a summation of two sensors at no-load; and
FIG. 15 shows experimental results of a radial flux density measurement under no-load conditions.

As set out above, a method of fault detection for synchronous machines may use various parameters linked to the magnetic field generated within the synchronous machine including parameters based on one or more of magnetic field strength, rotor current or voltage, stator current or voltage, and vibration. These sensor measurements are processed to identify data artefacts linked to the magnetic field, with the intention of finding patterns indicative of irregularities in the magnetic field in order to diagnose a fault. The processing of the sensor measurements includes one or more signal processing techniques based on time, frequency, and both time and frequency. The frequencies of interest are higher than the line frequency for the synchronous machine and are super-harmonics of that frequency. These may be frequencies above 75 Hz, e.g. between 75 Hz to 400 Hz, and/or may include frequencies in the kHz range and above. Typically the sampling frequencies used for this method are in the kHz range, or higher. FIG. 1 shows a flow chart for the main steps of an example fault detection process.

As illustrated in the examples below, the proposals include analysing the output of the signal processing in order to identify and categorise irregularities in the magnetic field that are indicative of a fault in the synchronous machine. It will be appreciated that this analysing can make use of computer aided pattern recognition techniques for recognising patterns in the processed sensor measurements. Several possible examples are discussed below, giving possible ways to implement such a method differing fault types.

EXAMPLE 1—BROKEN DAMPER BAR (BDB)

In the past, research related to BDB and end rings faults in large salient pole synchronous generators (SPSGs), has been limited, because the statistical population of this fault in comparison to other types of faults are low. Damper bars are used for synchronization of SPSG and quick response transients. In addition, damper bars protect the rotor winding during short circuit fault in stator bars. BDB fault in synchronous machines could occur due to the inadequate solid connection between the damper bar and the end ring. Current density in adjacent bars of BDB is increased even in the case of small fracture. The current of BDB flow through adjacent damper bars that lead to excess ohmic losses and consequently temperature rise. Thus, BDB fault causes hot spots around adjacent bars, which in turn increase the fracture speed of the neighbouring bars.

Studies of a pumped storage machine having a BDB fault have provided some useful results. The required electromagnetic torque during the machine start-up is partly provided by the currents through the damper bars. The magnetic flux density of the machine was studied under faulty condition. It was shown that BDB fault causes an asymmetric magnetic field. Additionally, the start-up time of the machine under the faulty condition was also investigated and proven to increased due to the fault. Nevertheless, start-up time is not a suitable indicator to diagnose BDB fault, because many factors could affect the machine start-up time such as misalignment, eccentricity faults, or load condition.

Damper bars of synchronous motors are used for synchronization and damping purposes until the rotor reaches synchronous speed. Therefore, the characteristic of the synchronous machine is similar to the induction motor prior to synchronization. In the steady-state condition, the amplitude of the current that passes through the bars are low, which make BDB fault detection difficult.

This example proposes a novel approach to detect BDB faults in SPSG during start-up time. The start-up procedure in this method first makes the machine to rotate at nominal speed and then subsequently increase the excitation current of the rotor field winding as a ramp function in a few seconds.

Modeling of SPSG with BDB Using Fem

A two dimensional (2-D) scheme of a simulated SPSG using finite element method (FEM) is displayed in FIG. 2. Complete geometrical and physical details of simulated SPSG like stator slots, rotor pole saliency, damper bars are taken into account. Non-linear characteristics of the laminated magnetic core, eddy effects are considered in order to simulate an SPSG in healthy and under BDB fault condition. In this simulation, the SPSG is analyzed under synchronous speed, and with rotor field current increased from zero up to its nominal value. A transient analysis during the machine's voltage build-up was performed to simulate this SPSG. In this FEM model, the motion equation is taken into account to include the mechanical forces coupled with magnetic forces, and the electrical equation to describe the rotor field supply.

Furthermore, saturation, stator and rotor slot design have considerable impact on fault signatures that should be considered in FEM modelling. Time and spatial harmonics due to the machine winding configuration and the power supply play a crucial role in the fault detection procedure. The direct current fed into the rotor field winding by power electronics can cause special time-harmonics in the air gap magnetic field. In addition, stator fractional slot windings can also have noticeable side effects on the flux density and the consequent stator terminal voltage and the load current.

In this model, an SPSG with a rated power of 100 KV A with a stator and rotor lamination consisting of the M-400 material is simulated. The specification of the example SPSG is shown in Table I. The simulated SPSG model has two layers of the fractional slot stator winding, and a rotor field winding fed by an ideal direct current supply. The BDB during start-up of the SPSG is modelled using FEM. FIG. 3 shows the distributed location of the damper bars in the SPSG. It is assumed that in faulty case, a damper bar is completely broken and the corresponding current is zero.

TABLE I

100 KVA/90 KW, 14 POLES, 400 V, 428 RPM,
SALIENT POLE SYNCHRONOUS GENERATOR

| Quantity | Values | Quantity | Values |
| --- | --- | --- | --- |
| Stator outer diameter | 780 mm | Stator inner diameter | 650 mm |
| No. of slots | 114 | No. of damper bars/pole | 7 |
| No. of turns | 8 | No. of turns/pole | 35 |
| Length of stack | 208 | Damper bar diameter | 7.3 mm |
| Widths of pole shoe | 108 mm | Widths of pole body | 50 mm |
| Widths of stator tooth | 8.5 mm | Height of stator tooth | 29.5 mm |

Theoretical Analysis of BDB Fault
The Pulsation Magnetic Field Due to Faulty Damper Bars The magnetic field in the air gap of the SPSG consists of the field from both stator and rotor in addition to the pulsation flux density from the damper winding. The flux density in the air gap during start-up only includes rotor and damper bars flux density. One of the well known and practical methods of fault diagnosis focus on air gap magnetic flux density monitoring [8]. In order to acquire this signal, hall effect sensors or search coils mounted in stator tooth or slots should be utilized. In transient operations of the synchronous machine, time harmonics in addition to spatial harmonics induce voltages in the rotor damper bars. The damper bars are short-circuited on both ends of the rotor poles by end rings. Consequently, current may pass through the damper bars, which in turn create a magnetic field in the air gap. The amplitude of this magnetic field varies significantly from transient to steady-state operation.

In order to monitor the pulsation magnetic field during machine start-up analytically, the magneto-motive force (MMF) of the damper bars can be calculated as described below:

$$MMF_p(\alpha, t) = \sum_j \sum_\zeta \frac{1}{\zeta} \left( \frac{2 \sin \zeta p(\alpha_{k+1} - \alpha_k)}{\zeta p \pi} \cos \zeta \left( p - \frac{p(\alpha_{k+1} - \alpha_k)}{2} - \omega t \right) \right) I_j$$

where p is the number of pole pairs, $\alpha$ is the angle of damper bar to the reference point in the 2-D plane in radians (FIG. 4), $I_j$ is damper bar current, $\omega$ is angular velocity, $\zeta$ is the spatial harmonic number since the harmonics of the winding function are expressed by $\zeta = 1 \pm 6n$ where n is an integer.

The pulsation flux density of damper bars ($B_p$), with respect to the produced magneto-motive force of the damper loop in the active length of machine pole (l), is given by the equation below:

$$B_p = \frac{2\mu_0}{\pi l p} \sum_j \sum_\zeta \frac{1}{\zeta} (\sin \zeta(p + p\alpha_k - \omega t) + \sin \zeta(-p + p\alpha_{k+1} - \omega t)) I_j$$

In regular operation of the SPSG, the air gap magnetic field from the rotor field and the damper bars are symmetrical. According to the above equation, the current of the faulty bar passes through adjacent bars, which increase the current density of the loop and causes local saturation. An unsymmetrical current distribution in the SPSG rotor bars results in an unbalanced magnetic field in the air gap.

Induced Voltage in the Field Winding Due to BDB Fault

An unbalanced magnetic field in the air gap due to a BDB fault induces a voltage in the rotor field winding. The total flux due to this distributed air-gap flux density that interlink poles and damper bars are given as:

$$\phi = \int_{\alpha_i}^{\alpha_j} B_p 2\pi r_r l d\alpha$$

since $\alpha_i$ and $\alpha_j$ are positions of the rotor pole that flux linkages pass through, $r_r$ is the outer radius of the rotor. Based on Faraday's law, induced voltage in the rotor field winding is as follows:

$$e = \frac{2\mu_0 N \omega}{\pi p^2} \left\{ \sum_j \sum_\zeta \frac{1}{\zeta^2} (\sin \zeta(p + p\alpha_k - \omega t) + \sin \zeta(-p + p\alpha_{k+1} + \omega t)) I_j \right\}_{\alpha_i}^{\alpha_j}$$

where N is the number of turns in the rotor winding. FIG. 4 shows the induced voltage in the field winding of the SPSG in healthy and faulty case. The induced voltage in the healthy case is due to the rotor and stator slot harmonics and inherent asymmetry of the machine. A BDB fault increases the pulsation magnetic field which distorts the air gap magnetic field, and consequently increased the amplitude of the induced voltage in the rotor field winding.

The amplitude of the induced voltage in the rotor field winding of the SPSG is directly related to location and number of BDB in the rotor pole. The current amplitude in the middle bars is smaller than the adjacent bars. Since the reluctance of the path that linkage flux passes along through middle bars to reach the stator core is smaller than other bars at the edge of the rotor pole. Consequently, the amplitude of the induced voltage in the excitation winding in a case of BDB at the middle of the rotor pole should be less than the rotor pole edge. The amplitude of the induced voltage in a case of three BDB at the middle of the pole is less than one BDB at the edge of the rotor pole as seen in FIG. 4.

Feature Extraction

Feature extraction is an essential part of the fault detection procedure of electrical machines. An appropriate index must be used to examine the most influenced signal of the SPSG under BDB fault. The sensitivity of the obtained signal by FE simulation to BDB fault is examined, and the induced voltage in the rotor field winding is chosen. Since its fault-sensitivity in comparison to other signal is high. On the other hand, the air gap magnetic field of the machine is perhaps the most reliable signal that could be used for various fault detection objective. However, fault detection based on air-gap flux density is an invasive method, requiring the installation of a sensor inside the machine, which is rarely possible. A signal processing tool is also of interest for fault detection of electrical machines. Acquired signals during the transient periods are non-stationary, so most signal processing tools like FFT are not applicable.

The Radius of Gyration (RG) could be used as a proper index to scrutinize the trend of BDB fault in SPSG. The RG has a specific value for any number of broken damper bars. RG is based on the time series data mining (TSDM) approach. TSDM is applied to the induced voltage in the rotor field winding in order to detect a hidden pattern due to BDB fault in SPSG during the transient condition.

Time Series Data Mining Method

TSDM is a nonlinear signal processing approach which is found on discrete stochastic models of reconstructed phase space based on dynamical system theory. It is proved that a metrically equivalent state space can be regenerated by a single sampled state variable. In other words, dynamical invariants are also preserved in reconstructed state space. The induced voltage in the rotor field winding in two states of healthy and faulty cases is considered as a state variable in order to recover the state space of SPSG. In other words, the acquired signal could reproduce a topologically equivalent state-space similar to original systems of an SPSG, in healthy or faulty cases.

Two methods can be used to reconstruct the state space, which is time-delay embedding and derivative embedding, respectively. Derivative embedding is not practical methods for experimental results since such results have higher-order derivatives that are sensitive to noise. Therefore, time delay embedding that transform scalar points into a vector form, in order to find the invariant of the dynamical systems, is chosen. Assuming that time series of the induced voltage in the field winding is given as follows:

$$e = \{e(j) - e(j-1), j = 2, 3, \ldots, K\}$$

since j is time index and K is the number of the sampled signal. A reconstructed state space which is also called phase space for j equal to 10 is shown for a healthy and a faulty SPSG in FIG. 5. The RG is used to quantify any changes in the area of the generated mass by TSDM to distinguish between the healthy and the faulty condition, which is presented below:

$$(RG)^2 = \frac{\sum_{j=1+l}^{K} ((e(j) - \mu_0)^2 + (e(j-l) - \mu_l)^2)}{K - l}$$

where l is time lag of the phase space, $\mu_0$ and $\mu_l$ are centers of gyration for their respective dimension.

The amplitude of the RG is increased upon the BDB fault occurrence. An amplitude of the RG existed even in the healthy case since the machine has some degree of inherent asymmetry. FIG. 5 shows the phase space of the healthy and faulty SPSG with one BDB. According to FIG. 5, a BDB fault increases the radius of the mass, since its radius in the healthy case is 0.1119 and increases to 2.4307 in a case of one broken damper bar. The amplitude of the RG does not show considerable sensitivity when the damper bar at the middle of the rotor pole (DB-4) is broken since the lowest current density is passing through that bar.

Furthermore, the magnitude of the RG in a case with three BDBs at the middle of the pole is less than one BDB at the edge. This because their currents are low. However, the RG increment due to a fault depends on the location and number of BDB. For instance, the most significant amount of current passing through the bars, at the edge of the rotor poles, consequently, its variation with respect to the other bars should be more noticeable. The location of the BDB is a critical factor that could modify the amplitude of the RG. In a case where the BDB fault happens at two edge bars of the same pole, its RG value is less than having one BDB at the edge. The pulsation magnetic field due to two BDBs at the edge of the pole is twice the one BDB. However, the symmetry of the faults mostly canceled out the pulsation magnetic fields. However, they do not entirely wipe out their effects, so there is still asymmetry in air gap magnetic field that gives rise to the RG index. The worst-case that increases the amplitude of the RG considerably is two adjacent BDB at same pole. In this case, the current of the two BDBs passes through the third one that causes local saturation. As a result, the pulsating magnetic field, local saturation, and lack of magnetic field due to BDBs leads to the intense unbalanced magnetic field which induced a large voltage in the rotor field winding.

Effects of Broken Damper Bar Location on the Proposed Index

The magnitude of RG depends on the asymmetry level of the air gap magnetic field caused by the BDB fault location. FIG. 6 shows the locations of BDB faults in different rotor poles. The third and fourth columns of Table II shows the variation of RG index with respect to the location of the BDB fault in different poles.

TABLE II

RADIUS OF GYRATION IN HEALTHY AND FAULTY SPSG FOR DIFFERENT NUMBER AND LOCATION OF BDBS

| Cases | RG | Cases | RG |
|---|---|---|---|
| Healthy | 0.1119 | Healthy | 0.1119 |
| 1BDB-No. 4 | 0.1121 | 3BDB (middle bars of 1 pole) | 0.3424 |
| 1BDB-No. 6 | 0.4091 | 6BDB in two poles (case a) | 0.6685 |
| 1BDB-No. 7 | 2.4307 | 2BDB-No. 7, 1 (case b) | 2.3577 |
| 2BDB-No. 6, 7 | 4.0743 | 2BDB-No. 1, 7 (case c) | 4.8344 |
| 2BDB-No. 1, 7 | 1.0442 | 2BDB-No. 1, 1 (case d) | 1.3047 |

In case (a), the amplitude of the RG in comparison to three BDB in one pole is increased two times. However, due to low current density at the middle bars, it is anticipated that its value should not be increased according to the number of BDBs. Although it is expected to have a higher degree of RG in case (b), which has two BDBs at the two edges of adjacent rotor pole, its amplitude does not increase in comparison to one BDB at the edge of one pole. Since the flux density level changes over the circumference of one of the poles (north or south). In case (c), both of the rotor poles have the same flux density polarity, which in turn increases the amplitude of the RG by a factor two of a BDB at the edge of the pole. In case (d), the amplitude does not increase but partly decreases, which could be explained based on the case (b).

CONCLUSION

This example deals with the detailed modeling, analytical study, and condition monitoring of SPSG under BDB faults. The analytical approach proved that damper bars induce a pulsation magnetic field due to the variation of damper bar currents as a result of the BDB fault that can distort the air gap flux density. This flux distortion induces an electromotive force in the rotor field winding that had an extreme sensitivity to BDB faults compared to the non-invasive methods. The time-series data mining method was applied to the induced voltage at the rotor field terminal in order to extract the precise feature to diagnose BDB fault. It was shown that this index has a high degree of sensitivity to the BDB faults. In addition, the effects of the number of bars and its location on RG was studied. It was shown that the amplitude of RG was increased by increasing the number of BDBs. Besides, the magnitude of RG could be increased if BDBs were located in the poles with the same polarity.

EXAMPLE 2—STATIC ECCENTRICITY

If the minimum air gap between rotor and stator core varies, then the synchronous generator has a condition which is called eccentricity fault. There are two types of eccentricity: static and dynamic. Static eccentricity is the condition where the shortest length in a nonuniform distribution of air-gap has a constant length and is fixed in space. Static eccentricity is one of prevalent fault in the synchronous generators. A lower level of eccentricity does not cause any damages to the machines; however, it should be detected at its early stage before the rotor core rub the stator core and windings.

Over the years, numerous methods have been examined to diagnose static eccentricity fault in the synchronous generators. Fault detection based on non-invasive approaches like stator terminal voltage or current, or machines parameters has been used to detect eccentricity fault in the synchronous generator. However, these methods could not detect the fault in its early stage since the topology of the rotor could mask the fault indicators in the mentioned signals.

In this example, the magnetic flux density of the air-gap is used to detect static eccentricity fault in the salient pole synchronous generator. The finite element approach is used to simulate the synchronous machine. The location and number of hall effect sensors that have been installed in the machine's air gap are discussed. The wavelet transform is used as a processing tool to treat the magnetic field signal. A novel index is introduced to detect the static eccentricity fault. It will be demonstrated that the proposed criterion index can precisely detect the healthy or faulty status of the machine and also the severity of the fault.

Finite Element Modeling:

A 100-kVA salient pole synchronous generator has been modeled using a two-dimensional finite element approach. A synchronous machine was modeled in two cases: the healthy and static eccentricity with different level of severity. A synchronous generator is examined at no load, in constant synchronous speed and rated current of the rotor field winding. The finite element modeling of the synchronous machine in the healthy case is presented in FIG. 7. The synchronous generator specification is described in Table III below.

TABLE III

| Characteristic of 100 kVA salient pole synchronous generator | | | |
|---|---|---|---|
| No of Stator Slots | 114 | No of Damper Bars per Pole | 7 |
| Stator No. of Turns | 8 | Rotor No of Turns/Pole | 35 |
| Stator Outer Diameter | 780 mm | Stator Inner Diameter | 650 mm |
| Widths of Pole Shoe | 108 mm | Widths of Pole Body | 50 mm |
| Widths of Stator Tooth | 8.5 mm | Height of Stator Tooth | 29.5 mm |
| Length of Stack | 208 mm | Damper Bar Diameter | 7.3 mm |

Measuring Points of Static Eccentricity:

Flux density distribution does not vary within a full rotor revolution under static eccentricity fault; however, that is not the case in the rotor field winding inter-turn fault or dynamic eccentricity fault. Static eccentricity gives rise to flux density variation with position; thus, the location of flux density measuring point is essential. FIG. 7 shows the location of measuring points in the air gap of the synchronous generator, which forms two pairs. The two measuring points are referred to right and left measuring points, while the other two points are referred to the up and down measuring points (The location of the sensors are shown in red circles). The location of the up and down measuring points is assigned at a 90-degree angle with respect to right and left measuring points.

Each pair of measuring points must be located on a diametrically opposing side of the synchronous machine in order to experience the same variation of flux density in the healthy or under the static eccentricity conditions. However, the variation of flux density in each of measuring points should not be the exact same due to lagging flux phenomena.

The flux density measuring points should detect the static eccentricity fault regardless of eccentricity fault orientation. There will not be any noticeable changes in the flux density of the air gap if measuring points are located orthogonal to the orientation of static eccentricity. Consequently, the measured magnetic field in the direct and the quadrature axis are decoupled, and it could be used to detect the direction of static eccentricity fault. However, with four measuring points that are distributed along the air-gap with a configuration explained above, eccentricity fault must be detected with one pair of measuring points disregarding the orientation of the fault. The maximum angle between the measuring points and the orientation of the static eccentricity should not exceed more than 90-degree. FIG. 7 presents the variation of magnetic flux density in the right measuring points in healthy and under 20% static eccentricity fault.

In this example, the static eccentricity was imposed along the positive x-axis, y-axis, and 45-degree concerning the positive x-axis in all simulation. The air-gap length increases in the right measuring point and equally decreases in the left measuring point. In other words, the amplitude of magnetic flux density in the left measuring point under a given level of static eccentricity will increase in comparison to the healthy case. FIG. 8. shows a polar diagram of the average flux density of each pole for right and left measuring points under healthy and eccentricity fault conditions.

Signal Processing:

The wavelet transforms (WT) is a useful signal processing tool used in different fields like power systems and electrical machines analysis. The time localization of different frequency component of a signal is used in the wavelet transform. The wavelet transforms, unlike traditional frequency-domain signal processing tools, do not use a fixed-width window. The wavelet analysing function adjusts its time widths according to the frequency component of a given signal, which lower frequencies are in the broader window and higher frequencies in the narrower one. In other words, signals with oscillations and localized impulses could be treated by using the wavelet transform in a way that high-frequency and low-frequency components are decomposed in the short and long-time intervals, respectively.

In this example, Daubechies-8 is used as a mother wavelet. Higher-order wavelet, similar to D-8 has a higher resolution that could improve the quality of fault detection in electrical machines. FIG. 9 shows the procedure of signal decomposition using discrete wavelet transforms where S is input signal, LPF and HPF are low-pass and high-pass filters. Preliminary, a given signal to the wavelet transform is divided into two halves which is the inputs of the LPF, and HPF. The output of the first level LPF is then separated into half the frequency bandwidth. This procedure is continued until the given signal is decomposed into the pre-defined value of that level. The sampling frequency in this paper is 10 KHz and based on Nyquist's theorem, the highest frequency that signal could contain would be 5 kHz. Consequently, the frequency bandwidth of the first level of the wavelet transform must be between 5-2.5 kHz.

Fault Detection:

The wavelet transforms (Daubechies-8) is applied on acquired magnetic field signal using hall-effect sensors in the air gap. Level seven of the wavelet transform shows a better sensitivity to the escalation of static eccentricity in comparison to other wavelet levels in a salient pole synchronous generator. FIG. 10 presents an absolute value of a detailed signal at level seven (D7) coefficient in healthy, and under 2.5%, 10%, and 20% static eccentricity. Magnitude's comparison of the wavelet coefficients in a case of static eccentricity under different severity level shows that the fault increases the oscillation level in D7 which is due to the airgap irregularities that leads to increase the amplitude of sub-harmonics in a magnetic field. A novel criterion index is proposed in order to quantify the value of D7 under different eccentricity fault level:

$$\text{Criterion Index} = \frac{\text{Average oscillation of absolute value of } D7}{\text{Mean value of magnetic field}}$$

where the oscillation of the absolute value of wavelet coefficient (D7) is defined in per unit regarding the average value of the air-gap magnetic field. The value of the proposed index for right sensor is decreased while the amplitude of the index for left sensor is increased according to Table VI. Because, in a case of static eccentricity in a positive x-axis direction, the air gap length on the right side increased which leads to reduction of the magnetic field in the air-gap; thus, the proposed feature should be decreased. It is presented that criterion index decreased from 0.6007 in the healthy case to 0.5969, 0.5975, and 0.5597 in a case of 2.5%, 10%, and 20% static eccentricity. The difference between the criterion index of a healthy and 2.5% static eccentricity proves that nominated feature could detect the static eccentricity fault at its early stage.

TABLE VI

The criterion index of magnetic flux from the right and left measuring points in healthy and faulty conditions.

| Study cases | Healthy | 2.5% SE | 10% SE | 20% SE |
| --- | --- | --- | --- | --- |
| Criterion Index (Right Sensor) | 0.6007 | 0.5967 | 0.5795 | 0.5597 |
| Criterion Index (Left Sensor) | 0.6003 | 0.6073 | 0.6228 | 0.6480 |

CONCLUSION

In this example, a novel feature is introduced as a criterion index to detect static eccentricity fault at an early stage in the salient pole synchronous generator. The magnetic field which is acquired using hall effect sensors installed in the air gap of the synchronous machine is used since it has adequate information about irregularities due to fault in the air gap. Finite element approach is used to model the synchronous machine in the healthy and faulty case by considering all detailed geometries and material characteristics. The Daubechies-8 is used as a mother wavelet to analyze the magnetic field in the healthy and faulty conditions. Its precision shows that this index could detect the fault at the early stage. In the final version of the paper, results for eccentricity at two other axes (y-axis, 45 degrees with respect to the positive x-axis) will be added. Besides, a section related to how to detect the location of the fault will be added. In addition, the simulation will be verified by experimental results.

EXAMPLE 3—SHORT CIRCUIT

This example includes a detailed electromagnetic analysis of the SPSG in a healthy and incipient inter-turn short circuit fault using the FE method. A procedure for short circuit defect in an excitation winding is proposed based on the average radial flux, polar diagram, sum of two sensors flux density, and frequency spectrum monitoring. Effects of the sensor location, sampling frequency, and re-sampling of the data are studied. Load effects on proposed methods are studied. The simulation results are verified by a custom-made 100 kV A SPSG.

Electromagnetic Analysis

Reliable fault diagnosis requires a sufficiently precise modelling method. In this example, a time stepping finite element method is employed to simulate SPSG. In this modeling, detailed geometrical complexities of the machine such as stator slots and rotor damper bars are considered. In addition, the saliency of the rotor poles, spatial distribution of armature winding, non-linearity of the core materials are included. The specifications of the proposed SPSG have been summarized in Table V below.

TABLE V

100 KVA/90 KW, 14 POLES, 400 V, 428 RPM, SALIENT POLE SYNCHRONOUS GENERATOR

| Quantity | Values | Quantity | Values |
|---|---|---|---|
| Stator outer diameter | 780 mm | Stator inner diameter | 650 mm |
| No. of slots | 114 | No. of damper bars/pole | 7 |
| No. of turns | 8 | No. of turns/pole | 35 |
| Length of stack | 208 | Damper bar diameter | 7.3 mm |
| Widths of pole shoe | 108 mm | Widths of pole body | 50 mm |
| Widths of stator tooth | 8.5 mm | Height of stator tooth | 29.5 mm |

The total magneto-motive force of the faulty pole under the inter-turn short circuit fault is reduced. Consequently, the flux density of the effected pole is decreased, and the air gap magnetic field is distorted. Two Hall effect sensors are located on the stator tooth in the opposite direction in order to measure the air gap radial magnetic field (These two sensors are named as of right and left point). The modelled SPSG has 14 poles that each of them has 35 turns. Different degree of inter-turn short circuit fault with the severity from 1 to 10 turns is simulated. FIG. 11 shows the air gap magnetic field variation for a one full rotor revolution that 7 out of 35 turns are short-circuited in one pole. The flux density in the air gap has a lower amplitude when the faulty pole sweeps by the sensors in comparison to healthy poles since the faulty pole with the reduced ampere-turns produces a decreased magneto-motive force. Inter-turn short circuit fault diagnosis is possible by comparing the average flux density of each pole to each other. However, fault detection is difficult in a case that number of shorted turn or the percentage of the shorted turns to a total number of pole turn are low.

FIG. 12 shows an average flux density of each pole in the space as a polar diagram for a healthy and faulty synchronous generator. In a healthy and ideal machine, the radial distance from the origin of a polar diagram to the average value of each pole would be equal. The average value of rotor pole magnetic field decrease by increasing the number of short-circuited turns. The average flux density of the faulty pole with respect to the average flux density of the all poles with 1, 2, 3, 7, and 10 short circuit turns are 99%, 97.9%, 96.8%, 93.7%, and 88.8%, respectively.

The frequency spectrum of the air gap magnetic field in FIG. 13 shows rapid changes of the sideband harmonics as a result of the inter-turn short circuit fault in the excitation winding. The amplitude of the fault-related harmonics increased with the increasing number of the shorted turns. The index frequency identifier is as follows:

$$f_{fault} = f_s \pm k \cdot f_r$$

where $f_s$ is the electrical frequency, $f_r$ is the mechanical frequency of the rotor, p is the number of pole pairs, and k is an integer. The plot of FIG. 13 has the largest amplitude spikes for a healthy machine, with the smaller amplitude spikes showing overlaid, from the top downward, 10, 7, 3, 2, 1 and then in some cases healthy. The most significant fault-related harmonic component in the frequency spectrum appears at the frequencies below the fundamental harmonic. The amplitude of the 7.14 Hz component with one short-circuited turn is about 60.22 dB or about 1 mT. With two short-circuited turns the amplitude increases to about to 2 mT and with 10 turns the amplitude is about 10.3 mT. The magnitude of all the fault-related harmonics shows a more or less linear increase in amplitude with increasing numbers of short-circuited turns.

The frequency spectrum of the sum of the magnetic field of two installed hall effect sensors in the air gap could also reveal the machine condition state. In a healthy and balanced operating condition, the two sensors based on theory experience the identical variation in flux density, causing the summation of them to become zero. In the event of short-circuited turns in the field winding, the reduced flux density of the faulty pole causes a spike in the sum of flux density each time the faulty pole passes by one of the measuring points. The simulation results of the healthy synchronous generator show that the fundamental component and its odd multiples are effectively cancelled out in the frequency spectrum as shown in FIG. 14. The plot of FIG. 14 thus has the components for the healthy machine cancelled out, with the remaining spikes showing overlaid, from the top downward, 10, 7, 3, 2 and 1 turn(s). The frequency components appear in the frequency spectrum are a direct consequence of the short-circuited turns in the field winding, which distorts the inherent magnetic symmetry of the healthy machine. In addition, there are fewer fault-related harmonics in the frequency spectrum. This spectrum only contains frequency spectra at odd multiples. The amplitude of the sum of the magnetic field spectrum is higher than the radial magnetic flux spectrum that makes fault detection easier.

Experimental Test Rig

A 100 kVA salient pole synchronous generator was used to verify the proposed theory. Apart from its size, the topology of the generator resembles an actual hydropower generator in a typical hydropower plant, such as those used in Norway. The laboratory SPSG has 14 poles, and the length of the air gap is 1.75 mm in order to achieve the proper synchronous reactance.

The absolute value of the flux density of the faulty pole and the two posterior poles passing by the right sensor are shown in FIG. 15. The faulty pole responds as expected; the flux density decreases with an increasing number of shorted turns. Thus, for the left most section of FIG. 15 the highest line is for healthy, and then the lines show, in sequence moving downwards, 1, 2, 3, 7 and 10 turn(s), with 10 turns being the lowest line. The flux density of the neighbouring pole with opposite polarity is also decreased slightly with an increasing number of short-circuited turns. This is a result of the decreased flux following the path throughout the faulty pole and on to the adjacent poles of opposite polarity.

CONCLUSION

In this example, the inter-turn short circuit fault in the excitation winding of the salient pole synchronous generator based on an air gap magnetic field is studied using the FE approach. Experimental results of the 100 kV A custom made SPSG is used to verify the FE results. The proposed procedure for inter-turn short circuit fault detection is based on using two hall effect sensors in the opposite direction. Comparing the average magnetic field in a polar diagram, the sum of the magnetic field of the two sensors, and the frequency spectrum of them could reveal the fault severity and location. The verified result by the experimental test is as follows. A high number of shorted turn could be detected immediately by analyzing the average magnetic field distribution or polar diagram. A uniform increase in the amplitude of the lower order harmonic components in the flux density spectrum could be observed. Monitoring the sum of magnetic flux of the two sensors in a machine that only has short circuit fault could be an invaluable tool for diagnostic purposes since the magnitude of the sum of magnetic flux density spectrum shows better response by increasing the number of shorted turns. The measurement should be coordinated with an encoder in order to identify the location of the faulty pole.

Machine Learning

The use of machine learning algorithms enhances the effectiveness of the above examples by providing automation and reproducibility for the recognition of patterns in the processed signals. With reference to Example 1, a machine learning pattern recognition system may be utilised to determine a match of the measured/calculated radius of gyration with known radius of gyration patterns that are indicative of a broken damper bar. In connection with Example 2, a machine learning pattern recognition system may be used to assess data including the criterion index in order to identify indications of possible static eccentricity faults. With reference to Example 3, a machine learning system may be used to replace some or all human input in connection with analyzing the average magnetic field distribution or polar diagram.

The types of sensors used in the Examples above, as well as other sensor types as discussed herein, may be used in combination, with the various signal processing steps and generation of indices also being done in combination. A combined signal processing system may perform all of the signal processing, with the resultant processed data being assessed automatically, such as via a machine learning system, to check for various kinds of faults.

The invention claimed is:

1. A method of fault detection in synchronous machines, wherein the method is carried out during start-up or shut-down of a synchronous machine, during which there is a transient magnetic field; the method comprising:
using at least one sensor to determine sensor measurements of one or more of magnetic field strength, rotor current or voltage, stator current or voltage, and vibration;
processing the sensor measurements to identify data artefacts linked to the transient magnetic field, wherein the processing includes one or more signal processing techniques based on any of time, frequency, and both time and frequency; and
analysing an output of the processing in order to identify and categorise irregularities in the transient magnetic field that are indicative of a fault in the synchronous machine, wherein the analysing includes using computer aided pattern recognition to recognise patterns in the processed sensor measurements.

2. A method as claimed in claim 1, wherein the irregularities in the transient magnetic field are indicative of faults linked with one or more of eccentricity faults, damper winding faults, and short circuit faults.

3. A method as claimed in claim 1, wherein the synchronous machine is a hydropower generator.

4. A method as claimed in claim 1, wherein the at least one sensor includes at least one existing sensor configured to control the synchronous machine during operation of the synchronous machine.

5. A method as claimed in claim 1, wherein the using at least one sensor to determine sensor measurements comprises using one or more existing sensors comprising one or more voltage or current sensors configured for use to monitor and/or control the synchronous machine during operation of the synchronous machine.

6. A method as claimed in claim 1, wherein the sensor measurements do not include any data from a sensor on a moving part of a rotor of the machine.

7. A method as claimed in claim 1, wherein the using at least one sensor to determine sensor measurements comprises using a sensor provided for the synchronous machine at a potential transformer thereof.

8. A method as claimed in claim 1, wherein the processing the sensor measurements includes determining a radius of gyration for the rotor of the synchronous machine and the analysing the output of the signal processing includes recognising characteristic patterns in the radius of gyration to identify and categorise irregularities in the transient magnetic field.

9. A method as claimed in claim 8, wherein the determining the radius of gyration data includes performing time series data mining on the sensor measurements, and the recognising characteristic patterns in the radius of gyration data is to detect a damper winding fault or an eccentricity fault.

10. A method as claimed in claim 8, wherein the sensor measurements include measurements of the induced voltage in the field winding of the synchronous machine, and the determining the radius of gyration date includes mapping the phase space for the induced voltage in the field winding of the synchronous machine.

11. A method as claimed in claim 10, wherein the using at least one sensor to determine sensor measurements includes using a sensor at a potential transformer to determine measurements of the induced voltage.

12. A method as claimed in claim 8, wherein the analysing the output of the signal processing is to identify a damper winding fault in the form of a broken damper bar, and wherein the analysing the output of the signal processing includes a comparison of the measured radius of gyration compared to equivalent measurements of radius of gyration for a healthy synchronous machine.

13. A method as claimed in claim 8, including wherein the analysing the output of the signal processing is to identify an eccentricity fault, and wherein the analysing the output of the signal processing includes determining a normalised radius of gyration with reference to a radius of gyration for a machine that is known to be healthy, with the normalised radius of gyration being defined as the difference between a radius of gyration for a healthy synchronous machine and the measured radius of gyration, with this difference being divided by the healthy radius of gyration.

14. A method as claimed in claim 13, wherein the analysing the output of the signal processing includes automated identification and categorisation of possible eccentricity faults by assessing the value of the normalised radius of gyration compared to a threshold value.

15. A method as claimed in claim 1, wherein the computer aided pattern recognition is based on a machine learning algorithm trained with a plurality of sensor measurements that have been signal processed to identify data artefacts linked to the transient magnetic field and that are known to relate to fault free machines as well as a plurality of sensor measurements that have been signal processed to identify data artefacts linked to the transient magnetic field and that are known to relate to machines with a fault.

16. A method as claimed in claim 1, wherein the at least one sensor includes at least one non-invasive sensor mounted external to the machine and/or configured to take measurements in a contactless fashion.

17. A fault detection system for fault detection in synchronous machines, the fault detection system comprising:
a data processing apparatus for connection to at least one sensor in order to receive sensor measurements of one or more of magnetic field strength, rotor current or voltage, stator current or voltage, and vibration during start-up or shut-down of a synchronous machine, during which there is a transient magnetic field;
wherein the data processing apparatus is configured to:
process the sensor measurements determined during start-up or shut-down of the machine to identify data artefacts linked to the transient magnetic field, wherein the processing includes one or more signal processing techniques based on any of time, frequency, and both time and frequency; and
analyse an output of the processing in order to identify and categorise irregularities in the transient magnetic field that are indicative of a fault in the synchronous machine, wherein the analysing includes recognising patterns in the processed sensor measurements using computer aided pattern recognition.

18. A fault detection system as claimed in claim 17, wherein the data processing apparatus is configured to:
use the at least one sensor to determine sensor measurements of one or more of magnetic field strength, rotor current or voltage, stator current or voltage, and vibration, during start-up or shut-down of the machine, during which there is a transient magnetic field.

19. A fault detection system as claimed in claim 17, comprising at least one existing sensor configured to control the synchronous machine during operation of the synchronous machine and/or at least one non-invasive sensor mounted external to the machine and/or configured to take measurements in a contactless fashion.

20. A fault detection system as claimed in claim 17, wherein the fault detection system does not use sensors placed on moving parts of a rotor of the machine.

21. A large synchronous machine acting as a hydropower generator, the synchronous machine including the fault detection system of claim 17.

22. A non-transitory computer-readable medium comprising instructions that, when executed within a fault detection system as in claim 17, will configure the data processing apparatus thereof to:
process the sensor measurements determined during start-up or shut-down of the machine to identify data artefacts linked to the transient magnetic field, wherein the processing includes one or more signal processing techniques based on any of time, frequency, and both time and frequency; and
analyse the output of the signal processing in order to identify and categorise irregularities in the transient magnetic field that are indicative of a fault in the synchronous machine, wherein the analysing includes recognising patterns in the processed sensor measurements using computer aided pattern recognition techniques.

23. A non-transitory computer-readable medium as claimed in claim 22, comprising instructions arranged to configure the data processing apparatus to perform a method of:
using the at least one sensor to determine sensor measurements of one or more of magnetic field strength, rotor current or voltage, stator current or voltage, and vibration, during start-up or shut-down of the machine, during which there is a transient magnetic field;
processing the sensor measurements determined during start-up or shut-down of the machine to identify data artefacts linked to the transient magnetic field, wherein the processing includes one or more signal processing techniques based on any of time, frequency, and both time and frequency; and
analysing the output of the signal processing in order to identify and categorise irregularities in the transient magnetic field that are indicative of a fault in the synchronous machine, wherein the analysing includes recognising patterns in the processed sensor measurements using computer aided pattern recognition techniques.

* * * * *